United States Patent
Sugimori et al.

(10) Patent No.: US 7,607,982 B2
(45) Date of Patent: Oct. 27, 2009

(54) GAME MACHINE AND METHOD OF CONTROLLING IMAGE DISPLAY OF THE GAME DEVICE

(75) Inventors: Yuji Sugimori, Tokyo (JP); Takashi Nakajima, Tokyo (JP)

(73) Assignee: Sega Corporation, Tokyo (JP)

(*) Notice: Subject to any disclaimer, the term of this patent is extended or adjusted under 35 U.S.C. 154(b) by 846 days.

(21) Appl. No.: 10/297,438

(22) PCT Filed: Apr. 19, 2002

(86) PCT No.: PCT/JP02/03940

§ 371 (c)(1),
(2), (4) Date: Dec. 6, 2002

(87) PCT Pub. No.: WO02/089936

PCT Pub. Date: Nov. 14, 2002

(65) Prior Publication Data

US 2003/0130037 A1 Jul. 10, 2003

(30) Foreign Application Priority Data

Apr. 19, 2001 (JP) ............................... 2001-121707

(51) Int. Cl.
*A63F 13/06* (2006.01)
(52) U.S. Cl. .................... 463/37; 463/1; 463/2; 463/36
(58) Field of Classification Search .................. 463/1–3, 463/30–33, 45, 46; 473/24
See application file for complete search history.

(56) References Cited

U.S. PATENT DOCUMENTS

| 4,253,090 A | 2/1981 | Storie et al. |
| 6,217,450 B1* | 4/2001 | Meredith ..................... 463/37 |
| 6,312,335 B1 | 11/2001 | Tosaki et al. |

FOREIGN PATENT DOCUMENTS

JP 10-214155 8/1998

(Continued)

OTHER PUBLICATIONS

Maximum Pool Review published Sep. 6, 2000, http://www.gamespot.com/pc/sports/maximumpool/review.html.*
Maximum Pool screenshots published Sep. 6, 2000, http://www.gamespot.com/pc/sports/maximumpool/screenindex.html.*

(Continued)

*Primary Examiner*—Ronald Laneau
*Assistant Examiner*—Ross A. Williams
(74) *Attorney, Agent, or Firm*—Dickstein Shapiro LLP

(57) ABSTRACT

A billiard game machine is used for playing a billiard game. A player operates a dummy cue (19) to thrust a cue ball object displayed on the screen (9a) of a display (9) disposed at a position corresponding to a back part of a dummy billiard table (7) so that the cue ball object rolls on a table object displayed on the screen (9a) of the display (9) and hits against an object ball object. A dummy bridge (11) for supporting the dummy cue (19) so that the dummy cue (19) is able to move for longitudinal back and forth movement in a predetermined range is disposed on the dummy billiard table (7). The billiard game machine enhances the verisimilitude of the billiard game.

16 Claims, 29 Drawing Sheets

FOREIGN PATENT DOCUMENTS

| | | | |
|---|---|---|---|
| JP | 10 214155 A | | 8/1998 |
| JP | 2000-93655 | | 4/2000 |
| JP | 2000093655 A | * | 4/2000 |
| JP | 2000-157745 | | 6/2000 |
| JP | 2000 093655 A | | 9/2000 |
| JP | 2000-237451 | | 9/2000 |
| WO | WO 01/24898 | | 4/2001 |

OTHER PUBLICATIONS

JP 2000093655 A, machine translation.*
JP 2000093655 A, Patent Abstract.*
Virtual Pool game manual, released Dec. 31, 1996.*
Laprad, "Virtual Pool 3", The Adrenaline Vault, Jan. 26, 2001.
Todd, "3-D Ultra Cool Pool", Dec. 8, 1999.

* cited by examiner

20a

20a

SENSING CUE-DIRECTION

1. SENSING DIRECTION IN HORIZONTAL PLANE

2. SENSING INCLINATION

GAME MACHINE AND METHOD OF CONTROLLING IMAGE DISPLAY OF THE GAME DEVICE

TECHNICAL FIELD

The present invention relates to a game machine that is used by a player to play a game by operating an operating means to move a movable object displayed on the screen of a display means, and a method of controlling an image displaying operation.

BACKGROUND ART

A billiard game machine disclosed in JP 2000-93655 A is one of game machines of this kind. To play billiards by the billiard game machine, a player operates a dummy cue to strike a cue ball placed on a billiard table so that the cue ball hits against an object ball to pocket the object ball.

When playing actual billiards, a player brings the tip of a cue close to a cue ball, withdraws the cue, and then thrusts the cue out toward the cue ball. The aforesaid known billiard game machine does not require such a preparatory operation and requires the player to thrust out the dummy cue simply toward the cue ball. Consequently, the player of the billiard machine has a sensation entirely different from that the player will have when the player plays the actual billiards, and hence is unable to have a realistic sensation.

When a player addresses a golf ball in playing golf, the player repeats a waggle, i.e., a preliminary swinging of a golf club to move the golf club head back and forth, in preparing for a shot, and then swings the golf club for a shot. Any golf game machines capable of simulating such an action have not been available.

Moreover, there have not been any game machines capable of changing the color, the shape and such of a cue or a golf club displayed by a display means according to such a preparatory action.

It is an object of the present invention to overcome the foregoing disadvantages of known game machines and to provide an improved game machine and a method of controlling an image displaying operation to be executed by the game machine.

DISCLOSURE OF THE INVENTION

A game machine according to a first aspect of the present invention comprises: a display means for displaying images for a game; an operating means to be operated by a player to enter operations made by the player; a control means capable of measuring at least a quantity of operation by which the operating means is operated or a speed of operation at which the operating means is operated as a manipulation signal, and of controlling the progress of a game according to the manipulation signal; an movable object displayed by the display means and movable according to the manipulation signal; and at least one other object; wherein the control means makes a decision about whether or not the game is to be continued on the basis of at least the distance of travel of the movable object, the speed of travel of the movable object or the positional relation between the movable object and the other objects, and changes at least one of the color, the shape, the size and the transparency of the movable object or at least one of the other objects according to the result of the decision.

The game machine according to the first aspect thus constructed changes the color, the shape, the size and/or the transparency of the movable object or the other objects according to the distance of travel of the movable object, the speed of travel of the movable object or the positional relation between the movable object and the other objects. Thus, the game machine gives the player a sensation which could not have been given by conventional game machines.

The game machine according to the first aspect may further comprise a decision means for making a decision about whether or not a decision about whether or not the movable object is in contact with the other object is to be made on the basis of the decision about whether or not the game is to be continued.

The game machine may further comprise a decision display means for displaying the result of decision about whether or not the game is to be continued by the display means. Thus, an image or sound indicating the decision about whether or not the movable object is in contact with the other objects is displayed by the decision display means.

An image displaying control method of controlling an image displaying operation of a game machine comprising a display means for displaying images, an operating means to be operated by a player, an movable object displayed by the display means and movable according to an operation made by the player, and at least one other object, according to a second aspect of the present invention comprises: a first step of sensing at least either a quantity of operation by which the operating means is operated or a speed of operation at which the operating means is operated; a second step of providing an operation signal on the basis of at least either the quantity of operation by which the operating means is operated or the speed of operation at which the operating means is operated; a third step of deciding a distance of travel or a speed of travel of the movable object on the basis of the operation signal; a fourth step of making a decision about whether or not the game is to be continued on the basis of at least the distance of travel of the movable object, the speed of travel of the movable object or the positional relation between the movable object and the other objects; and a fifth step of changing at least the color, the shape, the size or the transparency of the movable object.

According to the second aspect, the operation signal corresponding to the quantity of operation by which the operating means is operated or a speed of operation at which the operating means is operated by the operator, at least either the distance of travel or the speed of travel of the movable object is decided on the basis of the operation signal, a decision about whether or not the game is to be continued is made on the basis of at least the distance of travel of the movable object, the speed of travel of the movable object or the positional relation between the movable object and the other objects, and at least one of the color, the shape, the size and the transparency of the movable object is changed on the basis of the decision. Consequently, the player has a peculiar sensation.

The image displaying control method according to the second aspect may further comprise a sixth step of making, according to the decision about whether or not the game is to be continued, a decision about whether or not a decision about whether or not the movable object is in contact with the other objects is to be made. Thus, a decision about whether or not the movable object is in contact with the other objects is made according to the decision about whether or not the game is to be continued, and the result of contact between the movable object and the other objects is displayed on the basis of the decision about whether or not the movable object is in contact with the other objects.

The method according to the second aspect may further comprise a seventh step of displaying the decision about whether or not the game is to be continued by the display means. Thus, the decision about whether or not the movable object is in contact with the other objects is displayed by the display means.

According to a third aspect of the present invention, a billiard game machine comprises: a display means for displaying images for a game; a billiard cue for entering an operation made by a player; and a control means for sensing at least either quantity of operation of the billiard cue or speed at which the billiard cue is operated, providing an operation signal, and making a billiard game progress in an imaginary three-dimensional space; wherein the display means displays a cue object representing the billiard cue and operated according to the operation signal, and a cue ball object representing a cue ball, the control means makes a decision about whether or not the billiard game is to be continued on the basis of at least distance of travel of the billiard cue, speed of travel of the billiard cue or the positional relation between the cue object and the cue ball object, and changes at least one of the color, the shape, the size and the transparency of the cue object or the cue ball object on the display means according to the decision.

In the billiard game machine according the third aspect, the display means displays the cue object and the cue ball object in the imaginary three-dimensional space, a decision about whether or not the game is to be continued is made according to at least the distance of travel of the billiard cue, the speed of travel of the billiard cue or the positional relation between the cue object and the cue ball object, and at least the color, the shape, the size or the transparency of the cue object or the cue ball object is changed according to the decision.

The billiard game machine according the third aspect may further comprise a decision means for making a decision about whether or not a decision about whether or not the cue object is in contact with the cue ball object is to be made.

The billiard game machine according the third aspect may further comprise a decision means for making a decision about whether or not the game is to be continued on the basis of the distance between the cue object and the cue ball object in the imaginary space.

The billiard game machine according the third aspect may further comprise a decision displaying means for making the display means display the decision about whether or not the game is to be continued.

A billiard game control method according to a fourth aspect of the present invention of controlling a billiard game machine comprising an operating means for entering an operation signal provided by a player, and a display means for displaying images for a game, and capable of carrying out a billiard game in an imaginary three-dimensional space on the basis of the operation signal comprises: a first step of displaying a cue object that acts according to the operation signal and a cue ball object; a second step of measuring at least the quantity of operation or the speed of operation of the operating means; a third step of providing an operation signal on the basis of at least either the quantity of operation or the speed of operation; a fourth step of determining at least either the distance of movement or the speed of movement of the cue on the basis of the operation signal; a fifth step of making a decision about whether or not the billiard game is to be continued on the basis of at least the distance of movement of the cue, the speed of movement of the cue or the positional relation between the cue object and the cue ball object; and a sixth step of changing at least one of the color, the shape, the size and the transparency of at least the cue object or the cue ball object according to the decision in the fifth step.

The cue object and the cue ball object are displayed according to the operation signal provided by the operating ding to the operation signal provided by the operating means operated by the player, at least a quantity of operation by which the operating means is operated or a speed of operation at which the operating means is operated is measured, a decision about whether or not the game is to be continued is made according to at least the quantity of operation, a signal representing the speed of operation or the positional relation between the cue object and the cue ball object, and at least the color, the shape, the size or the transparency of at least the cue object or the cue ball object on the display means is changed. Consequently, the attraction of the game for the player is enhanced greatly.

The billiard game control method according to the fourth aspect may further comprise a seventh step of making a decision about whether or not a decision about whether or not the cue object is in contact with the cue ball object is made according to the decision about whether or not the billiard game is to be continued.

The control method according to the fourth aspect may further comprise an eighth step of displaying the decision about whether or not the billiard game is to be continued by the display means. Thus, the decision about whether or not the billiard game is to be continued is displayed.

According to a fifth aspect of the present invention, a billiard game machine is constructed such that a cue object can strike a cue ball object on the screen of a display disposed at a position corresponding to a back part of a dummy billiard table when a player operates a dummy cue, and is capable of carrying out a billiard game by rolling the cue ball object on a billiard table object on the display and by making the cue ball object hit against an object ball object; wherein a dummy bridge for supporting the dummy cue so that the dummy cue is able to move for longitudinal back and forth movement in a predetermined range is disposed on the dummy billiard table, a cue-receiving space capable of receiving a front end part of the dummy cue is defined by the dummy billiard table or a prolonged plane of the dummy billiard table, and the lower surface of the display or the lower surface of a protective member attached to the lower surface of the display, and the intervals between the dummy billiard table, and the dummy bridge and the display are determined so as to meet dimensional relation that enables the front end part of the dummy cue to enter the cue-receiving space under lower surface of the display or the lower surface of the protective member attached to the lower surface of the display without making the tip of the dummy cue strike against the screen or the front surface of the display even if the dummy cue supported on the dummy bridge is thrust out in a state where the dummy cue is in contact with the top surface of a rail of the dummy billiard table.

In the billiard game machine according to the fifth aspect, the player is able to rest the dummy cue on the dummy bridge plated on the dummy billiard table and to thrust out the dummy cue forward toward the display, so that the player has a playing sensation similar to that the player will have when the player is actually playing billiards.

Even if the dummy bridge moves on the dummy billiard table changing the inclination of the dummy cue when the player thrusts the dummy cue placed on the dummy billiard bridge forward, the front end part of the dummy cue advances into the cue-receiving space underlying the lower surface of the display or the protective member attached to the lower surface of the display, and the collision of the front end part of the dummy cue against the screen or the front surface of the display is avoided. Thus, the destruction of the display can be prevented.

The billiard game machine according to the fifth aspect may further comprise a cue-drop preventing member rising from a peripheral part of the dummy billiard table. When the dummy cue is placed on the dummy billiard table after the termination of the game, the cue-drop preventing member extending along the periphery of the billiard table prevents the dummy cue from dropping from the dummy billiard table. Thus, the breakage and the loss of the dummy cue can be avoided.

According to a sixth aspect of the present invention a billiard game machine is constructed such that a cue object can strike a cue ball object on the screen of a display disposed at a position corresponding to a back part of a dummy billiard table when a player operates a dummy cue, and capable of carrying out a billiard game by rolling the cue ball object on a billiard table object on the display and by making the cue ball object hit against an object ball object; wherein a dummy bridge for supporting the dummy cue so that the dummy cue is able to move for longitudinal back and forth movement is disposed on the dummy billiard table, a cue operating means capable of providing an operation signal based on at least the quantity or the speed of operation of the dummy cue is placed on the dummy bridge, and an cue image changing means superposes a semitransparent cue object image of the cue object on the cue ball object when at least the quantity of operation, the speed of operation or the distance between the cue object and the cue ball object is in a predetermined range, and replaces the semitransparent cue object image displayed on the screen of the display with an opaque cue object image when at least a signal representing the quantity of operation or a signal representing the speed of operation is not smaller than a predetermined value.

The billiard game machine according to the sixth aspect clearly shows a strike point on the cue ball object on the screen without being obstructed by the cue object on the screen of the display in a state before starting the operation of the dummy cue placed on the dummy bridge to facilitate an operation for thrusting the dummy cue.

According to a seventh aspect of the present invention, a billiard game machine comprises: a display means for displaying images for a billiard game; an operating means to be operated by a player to provide operation signals; and a control means capable of making the billiard game progress according to the operation signals in an imaginary three-dimensional space; wherein a dummy bridge for supporting a dummy cue so that the dummy cue is able to move for longitudinal back and forth movement is disposed on a dummy billiard table so as to be movable in longitudinal directions and lateral directions.

According to this aspect, the player is able to have a sensation of adjusting the direction of the dummy cue as the player pleases by moving the dummy bridge.

The billiard game machine according to the seventh aspect comprising the display means for displaying images for a billiard game, and the operating means to be operated by the player to provide operation signals, and a control means capable of making the billiard game progress according to the operation signals in an imaginary three-dimensional space may further comprise a dummy bridge movement measuring means for measuring distances of longitudinal and lateral movement of the dummy bridge on the dummy billiard table; a cue ball strike point displaying means for displaying a strike point where the tip of the cue object comes into contact with the cue ball object according to a measurement signal provided by the dummy bridge movement measuring means; and a cue ball displaying means for determining a direction in which the cue ball object moves according to the strike point on the cure ball object, and determining a moving speed according to a striking speed and displaying the moving speed.

Thus, the object ball object can be driven into a pocket by rolling the cue ball object on the screen according to the idea of the player when the player moves the dummy bridge properly to adjust the cue object so that the tip of the cue object is directed properly toward the strike point on the cue ball object, which makes the player have a high sensation of play.

According to an eighth aspect of the present invention, a billiard game machine comprises: a display means for displaying images for a billiard game; an operating means to be operated by a player to provide operation signals; and a control means capable of making the billiard game progress according to the operation signals in an imaginary three-dimensional space; wherein an imaginary ball object indicating a strike point for a cue ball object to strike to pocket an object ball positioned on a line aligned with a direction in which a cue object displayed on the screen of the display means is to be thrust is displayed around the object ball object.

In an actual billiard game, each player imagines an imaginary ball to determine a target position on an object ball at which a cue ball is to strike the object ball. According to the eighth aspect, the cue object can be easily thrust toward the center of the imaginary ball object on the screen. Consequently, even a beginner is able to drive the object ball object into a pocket without fail.

According to the eighth aspect, the imaginary ball object can be displayed when the object ball object can be pocketed by driving the object ball object with the cue ball object. Therefore, when the object ball object can be pocketed by striking the same with the cue ball object, the imaginary ball object is displayed to pocket the object ball object.

According to the eighth aspect, the displaying of the imaginary ball object can be omitted when the object ball object is the last one. Thus, the displaying of an imaginary ball object is omitted when the object ball object is the last one to make the player exert the player's skill.

According to a ninth aspect of the present invention, a billiard game machine comprises: a display means for displaying images for a billiard game; an operating means to be operated by a player to provide operation signals; and a control means capable of making the billiard game progress according to the operation signals in an imaginary three-dimensional space; wherein a dummy bridge for supporting a dummy cue so that the dummy cue is able to move for longitudinal back and forth movement in a predetermined range is disposed on a dummy billiard table, and a cue-thrusting direction changing means changes cue-thrusting direction in which a cue object is thrust relative to a cue ball object on the screen of the display means, and the billiard table object as viewed from the cue-thrusting direction.

Thus, the cue-thrusting direction in which a cue object is thrust relative to the cue ball object on the screen of the display means, and the billiard table object as viewed from the cue-thrusting direction can be optionally changed, which can make the player have a sensation of actually playing billiards.

The billiard game machine according to the ninth aspect may further comprise a magnification selecting means for selecting a magnified image of a narrow region around the cue ball object on the screen of the display means or a reduced image of a wide region around the cue ball object. Thus, the player is able to play a delicate billiard game.

The billiard game machine according to the ninth aspect may further comprise an image changing means capable of selectively displaying an oblique image of the billiard table object as viewed from a substantially horizontal direction or from an oblique direction at a small angle to the horizontal or an orthogonal image of the billiard table object as viewed orthogonally on the screen of the display means. Thus, the positional relation in a plane between the cue ball object and the object ball object on the billiard table object can be accurately grasped from images displayed on the screen, which enhances the success plate of play.

BEST MODE FOR CARRYING OUT THE INVENTION

A first embodiment of the present invention illustrated in FIGS. 1 to 35 will be described hereafter.

Figure 1:
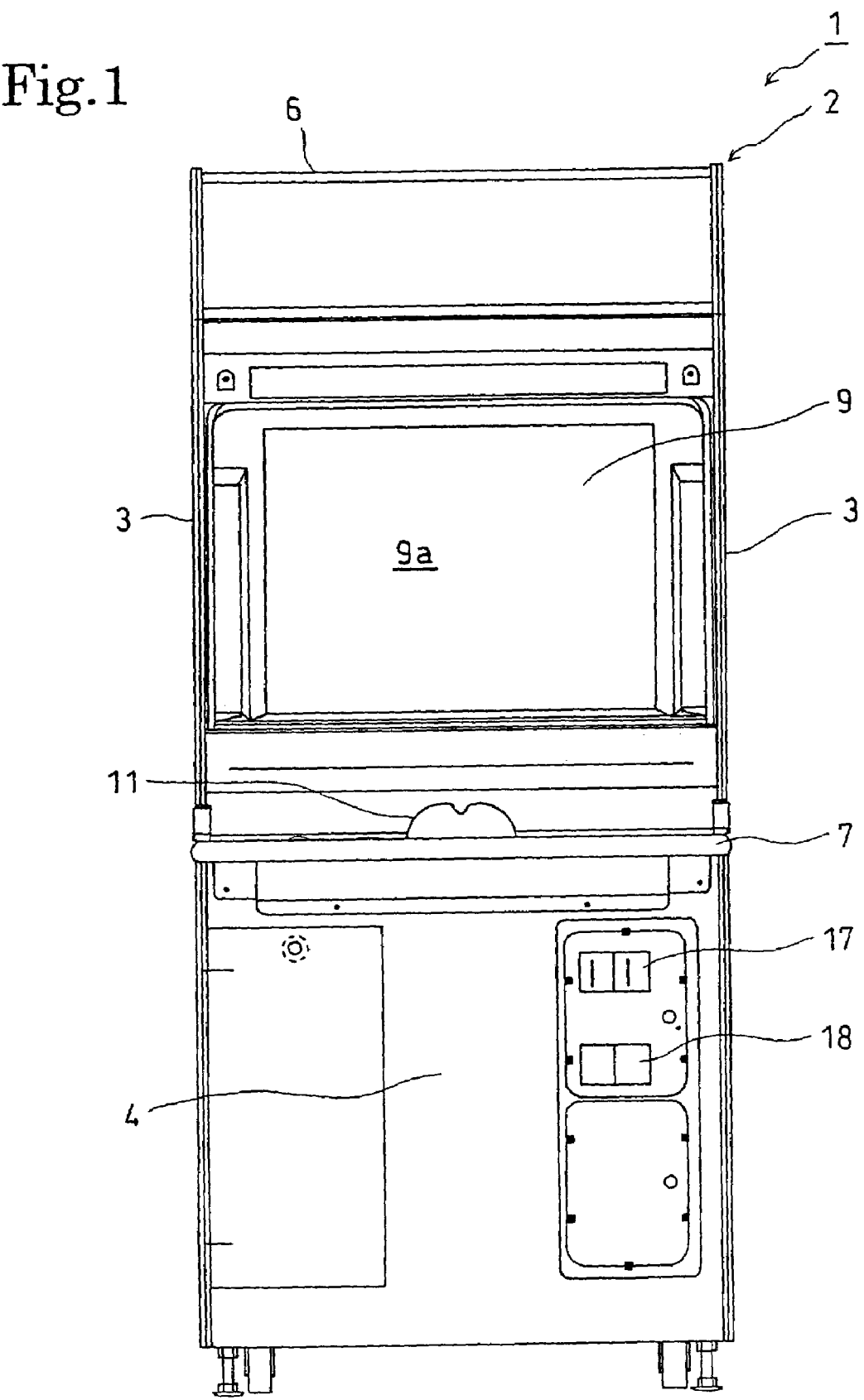
FIG. 1 is a front elevation of a billiard game machine in a first embodiment of the present invention.
Figure 2:
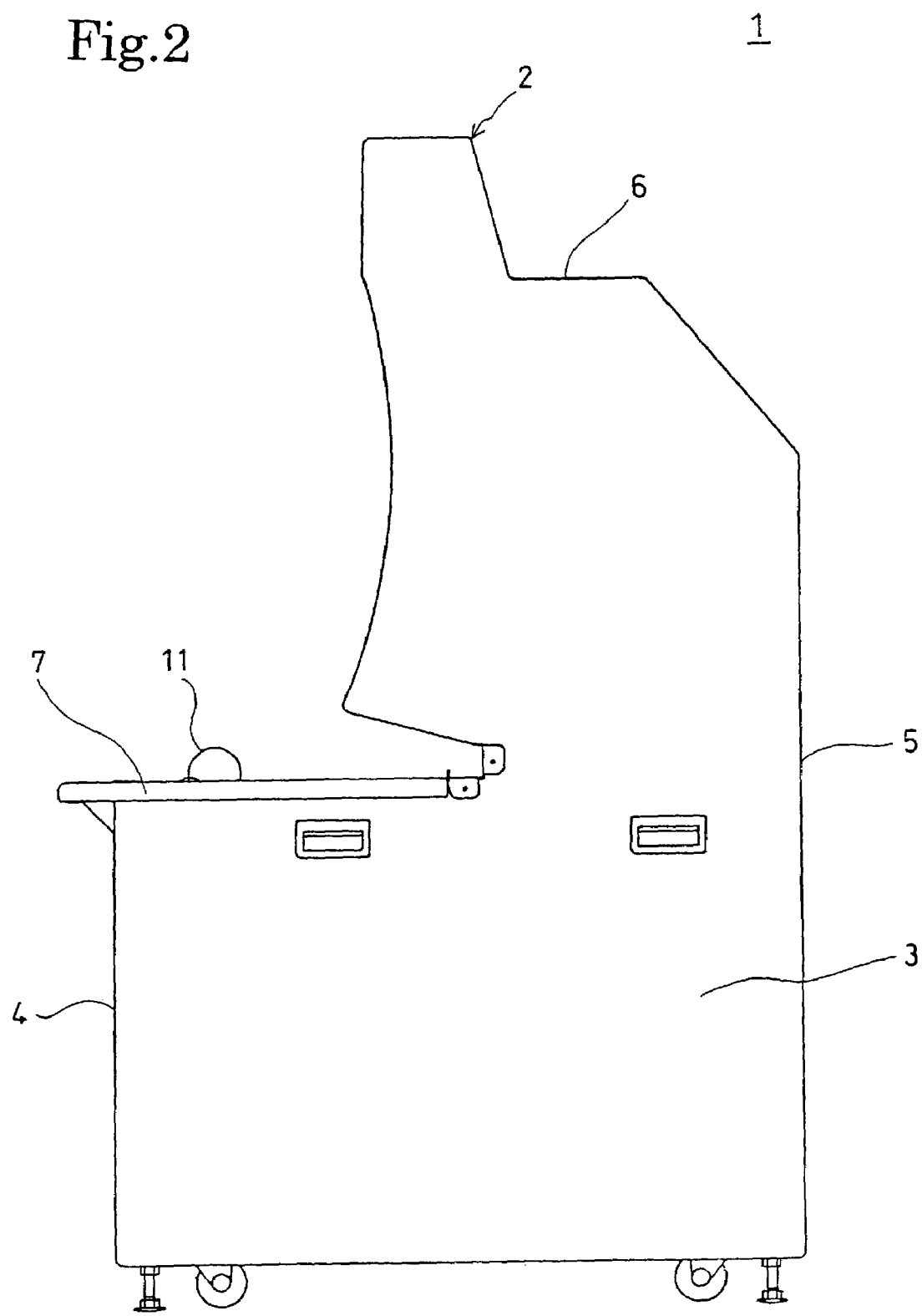
FIG. 2 is a side elevation of the billiard game machine shown in FIG. 1.
Figure 3:
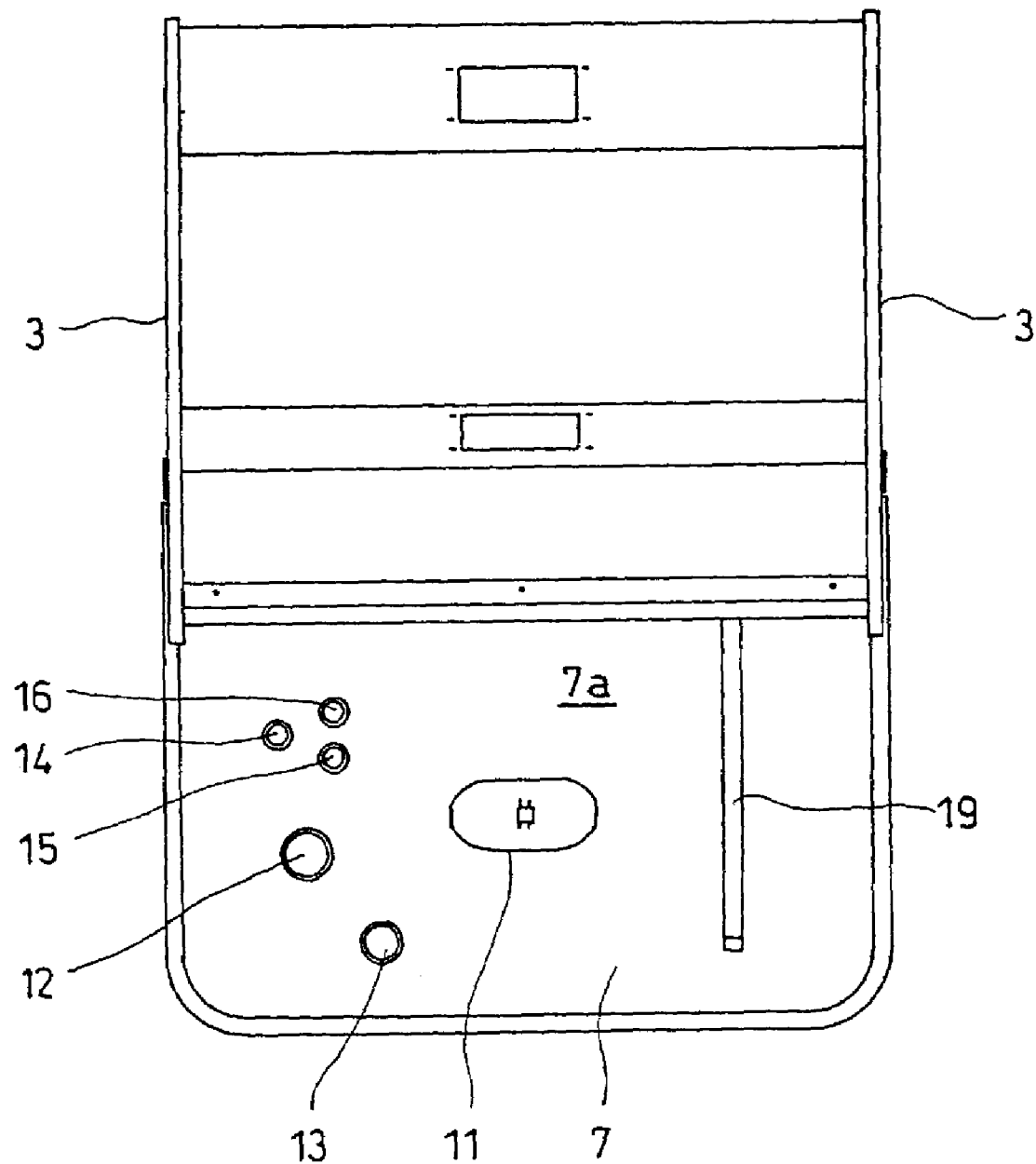
FIG. 3 is a plan view of the billiard game machine shown in FIG. 1.

Referring to FIGS. 1 to 3, a cabinet 2 included in a billiard game machine 1 has right and left side panels 3, a front panel 4, a top panel 6, and a bottom panel, not shown. As shown in FIGS. 2 to 5, a dummy billiard table 7 is horizontally extended between front sections of respective vertically middle parts of the side panels 3. A cue-retaining 8 of elastic rubber is attached to the opposite side edges and the front edge of the dummy billiard table 7 so as to protrude above the upper surface of the dummy billiard table 7. A display 9 is disposed above the dummy billiard table 7 so as to be spaced a predetermined distance apart from the upper surface of the dummy billiard table 7. A wood protective plate 10 is extended under the display 9.

Figure 4:
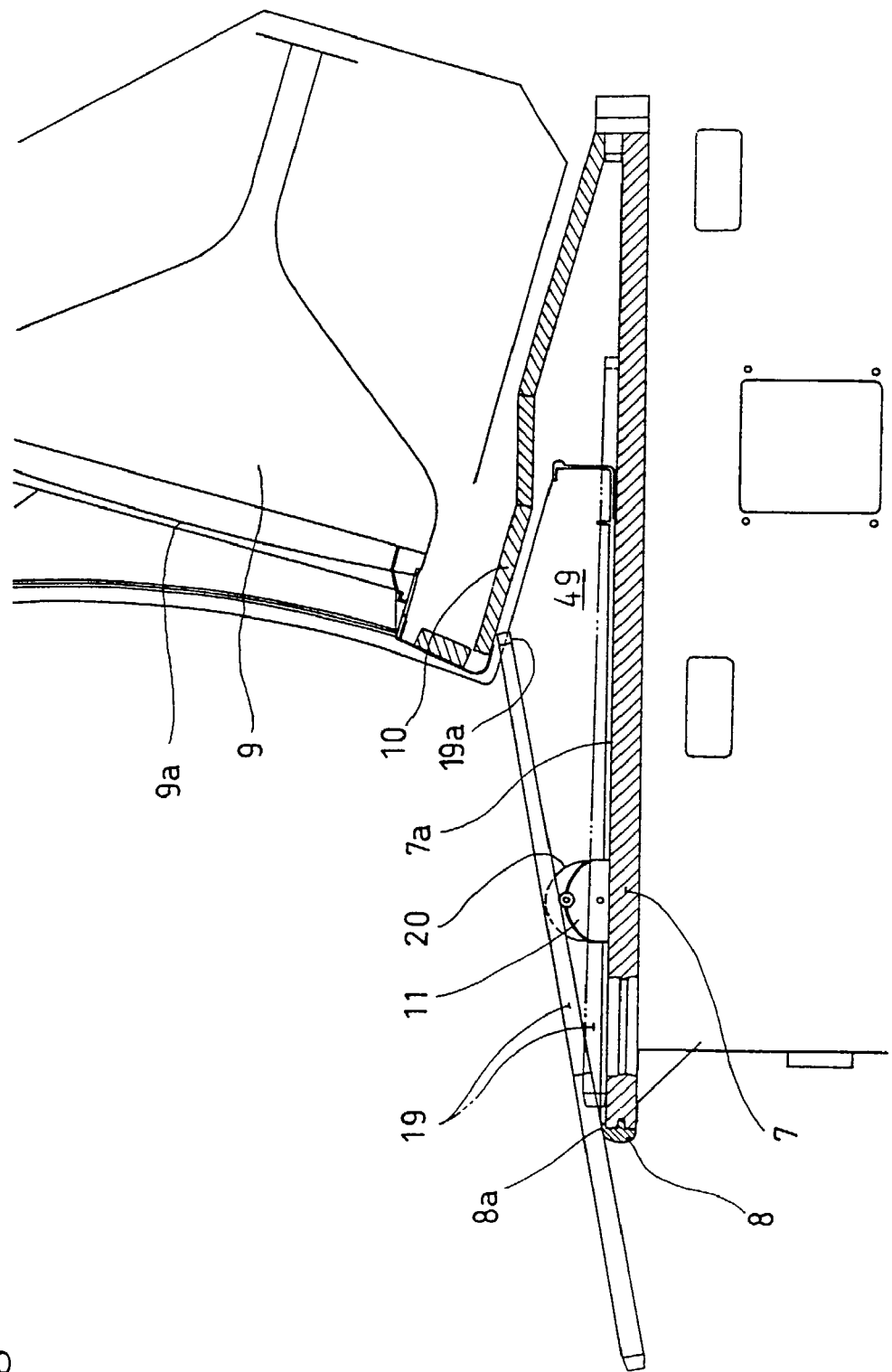
FIG. 4 is an enlarged sectional view of a part around a table of the billiard game machine shown in FIG. 1.
Figure 5:
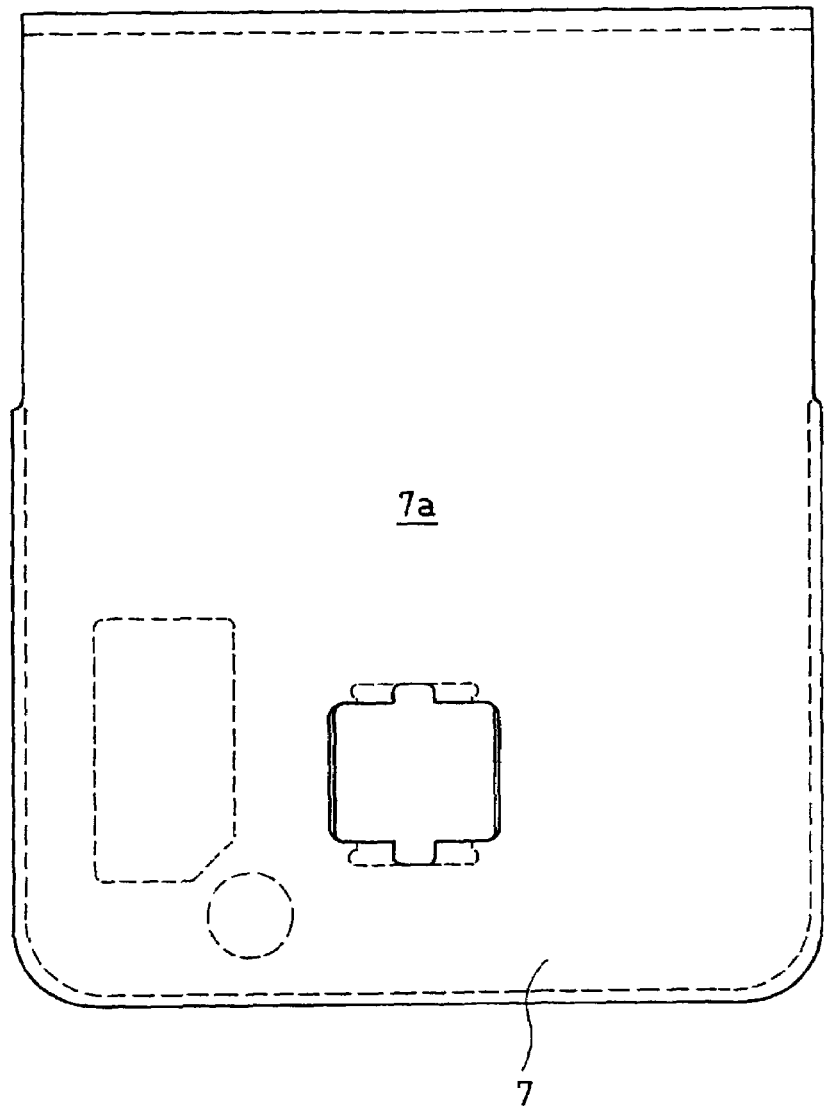
FIG. 5 is a plan view of a wood panel of the table of the billiard game machine shown in FIG. 1.
Figure 6:
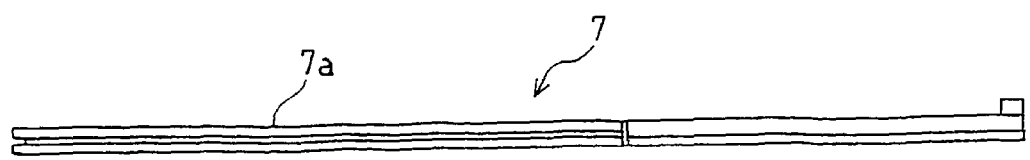
FIG. 6 is a side elevation of the wood panel of the table of the billiard game machine shown in FIG. 1.

As shown in FIGS. 3 and 4, a rising dummy bridge 11 having a recessed idle part is disposed in a substantially central part of a play surface 7a of the dummy billiard table 7 extending from right under the front surface of the display 9 toward the front. The dummy bridge can move longitudinally and laterally along the upper surface of the dummy billiard table 7 in a predetermined range and can automatically return to its initial position when the same is left restricted.

As shown in FIG. 3, a cue-direction control ball 12 is disposed on the play surface 7a of the dummy billiard table 7 on the front left-hand side of the dummy bridge 11. A start mode selecting push-button switch 13 is disposed on the front side of the cue-direction control ball 12 nearer to a laterally middle part than the cue-direction control ball 12. A top view push-button switch 14 is disposed on the back left-hand side of the cue-direction control ball 12. A magnifying pushbutton switch 15 and a reducing push-button switch 16 are arranged longitudinally at positions nearer to the laterally middle part than the top view push-button switch 14.

Figure 12:
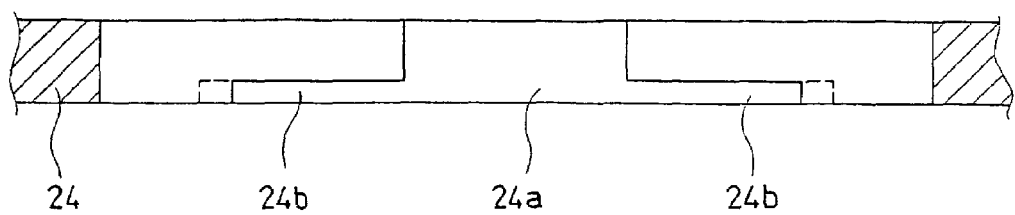
FIG. 12 is a sectional view of the part provided with the opening of the wood board of the table.

As shown in FIG. 12, a medal slot 17 is formed in a right part of the front panel 4. A medal count indicator 18 for indicating the number of deposited medals is disposed below the medal slot 17 on the front panel 4.

As shown in FIG. 4, a cover 20 included in the dummy bridge 11 is provided with a middle groove 20a (FIGS. 7 to 10). The billiard game machine is provided with a dummy cue 19 having a diameter smaller than the width of the middle groove 20a of the cover 20 and a length shorter than that of a real cue. When the dummy cue 19 is placed on the dummy billiard table 7 as indicated by two-dot chain lines, the dummy cue 19 is prevented from falling off the dummy billiard table 7 by the cue-retaining 8 rising from the dummy billiard table 7.

Figure 7:
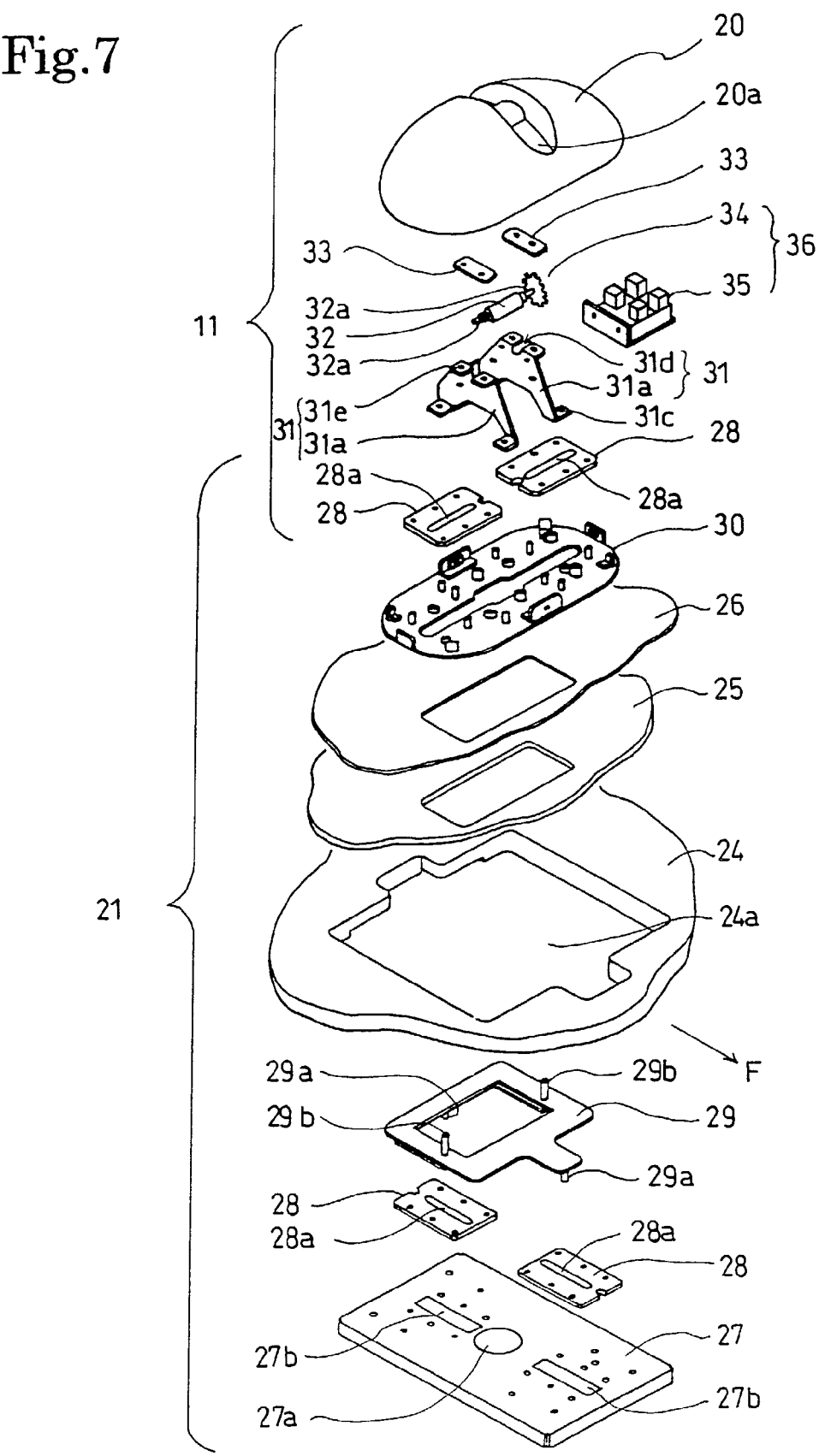
FIG. 7 is an exploded perspective view of a dummy bridge and a horizontal-sliding unit for horizontally sliding the dummy bridge.
Figure 8:
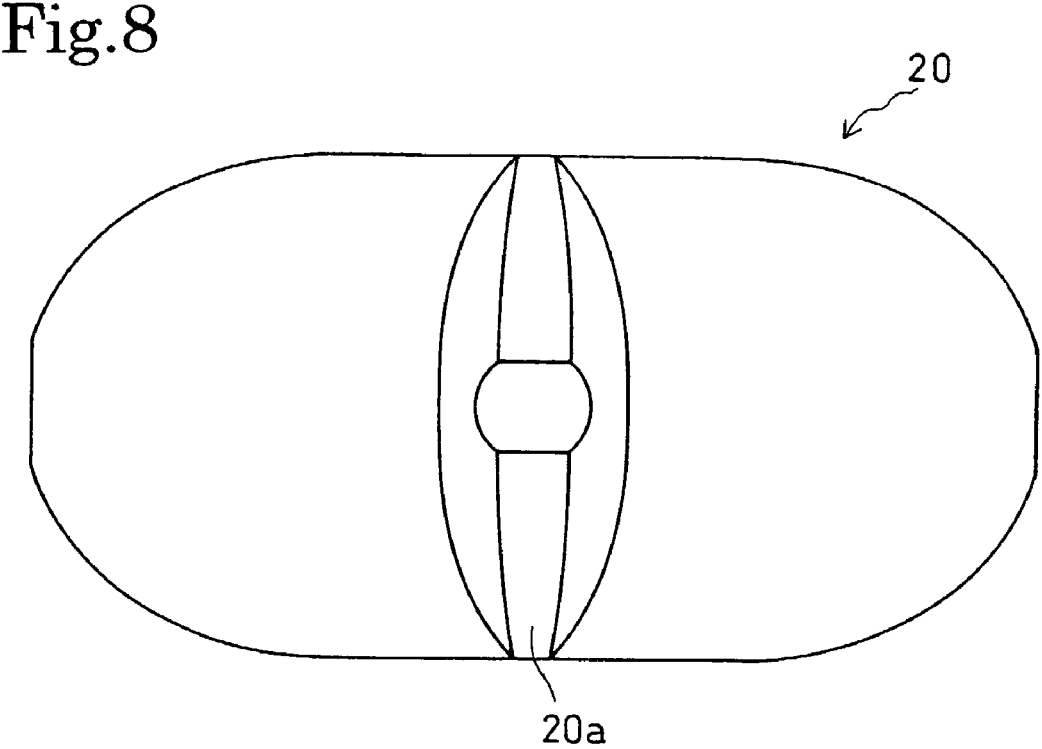
FIG. 8 is a plan view of a dummy bridge cover for covering the dummy bridge.
Figure 9:
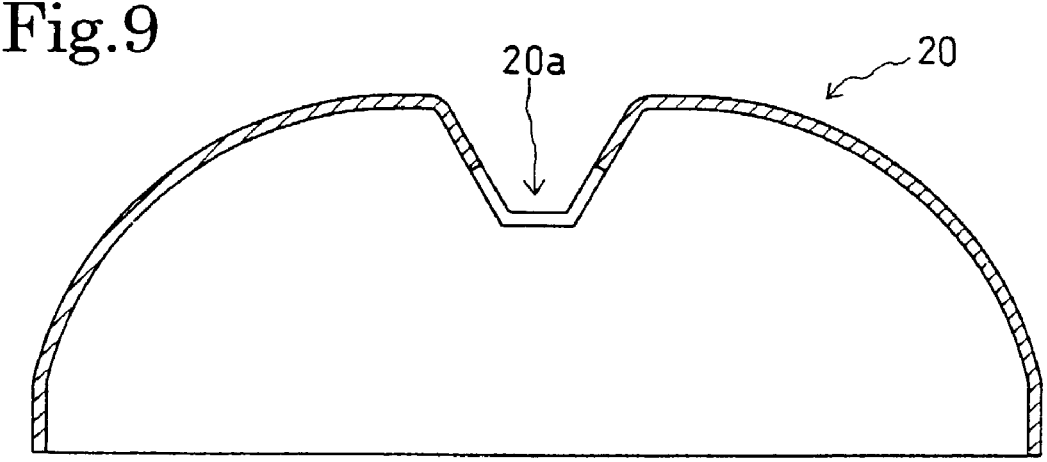
FIG. 9 is a front sectional view of the dummy bridge cover.
Figure 10:
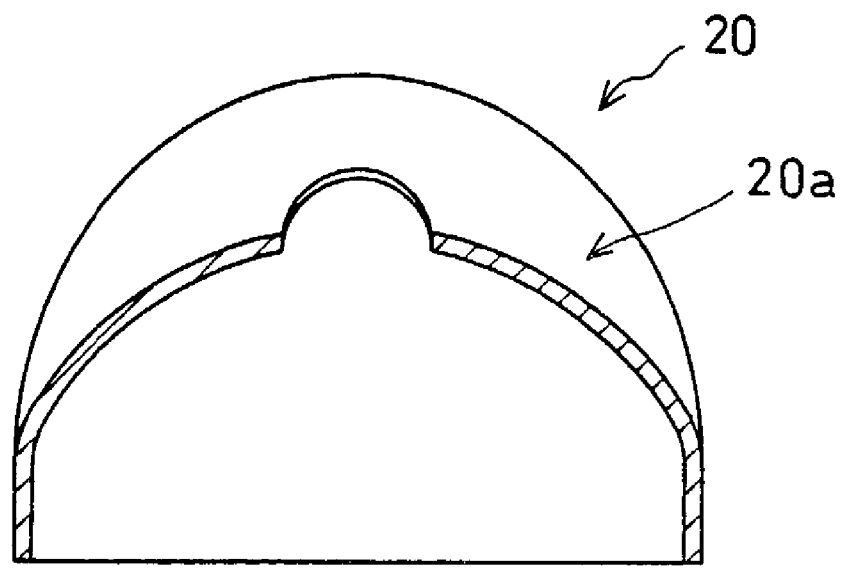
FIG. 10 is a side sectional view of the dummy bridge cover.
Figure 24:
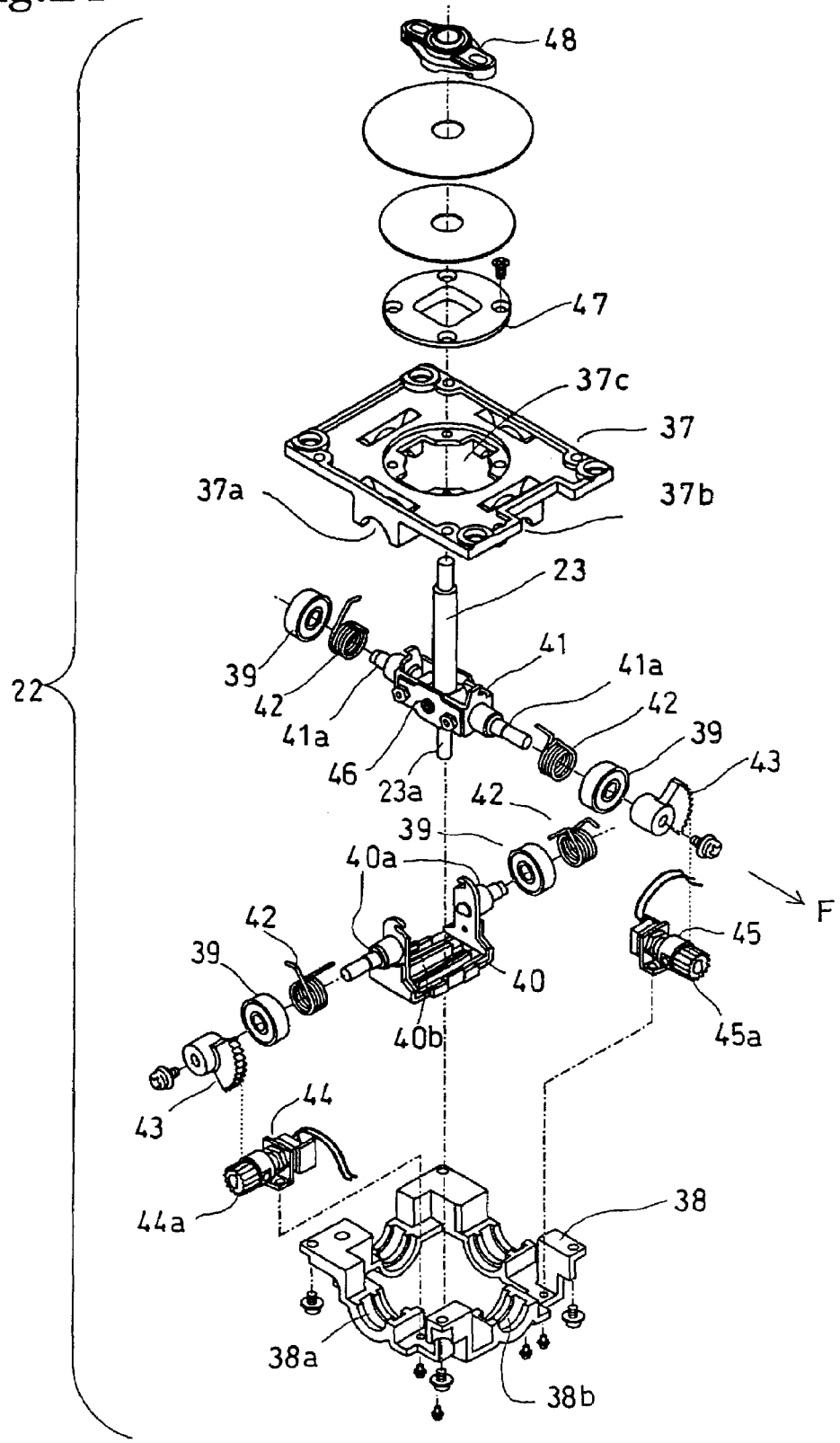
FIG. 24 is an exploded perspective view of a bridge position measuring unit.
Figure 25:
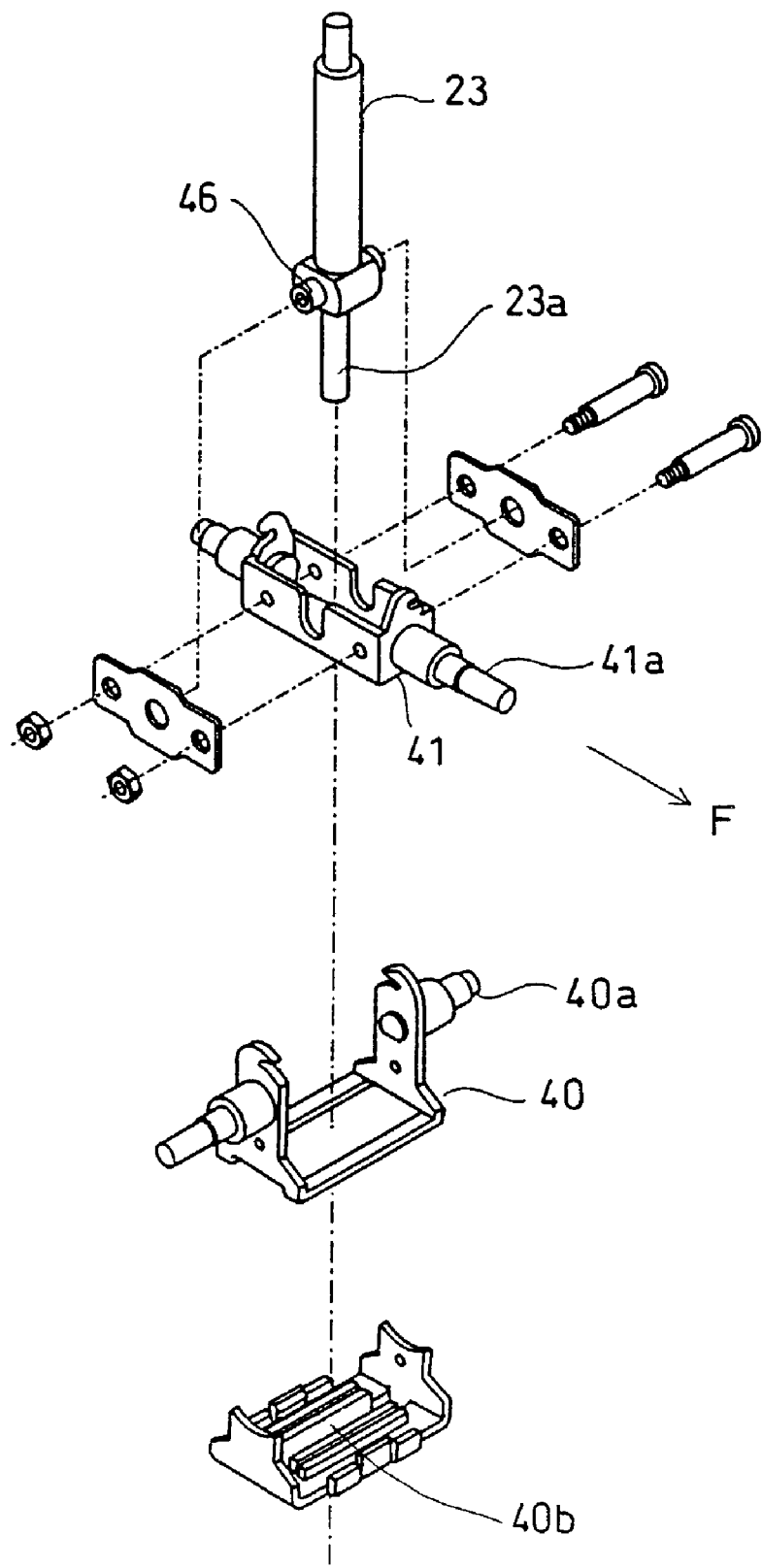
FIG. 25 is an exploded perspective view of a shaft swinging mechanism for swinging a swing shaft included in the bridge position measuring unit.

Referring to FIG. 7, the dummy bridge 11 includes a horizontal slide unit 21 that enables the cover 20 move longitudinally and laterally along the upper surface of the dummy billiard table 7, and a bridge position measuring unit 22 including a lever 23 pivotally supported for longitudinal and lateral tilting according to the horizontal movement of the horizontal slide unit 21 as shown in FIGS. 24 and 25. The respective sizes of the display 9 and the dummy bridge 11, the arrangement and interval between the dummy bridge 11 and the display 9 on the dummy billiard table 7, and the height of the upper edge 8a of the cue-retaining 8 from the dummy billiard table 7 are determined such that the tip 19a of the dummy cue 19 does not hit against the screen 9a of the display 9 and is able to advance into a space 49 between the wood protective plate 10 and the dummy bridge 11 when the dummy cue 19 is thrust out with the dummy cue 19 supported on the dummy bridge 11 and rested on the upper edge 8a of the cue-retaining 8 (which corresponds to the top surface of the rail of a billiard table) The construction of the horizontal slide unit 21 will be described with reference to FIGS. 7 to 23. In FIG. 7, the arrow F indicates a forward direction.

Figure 11:
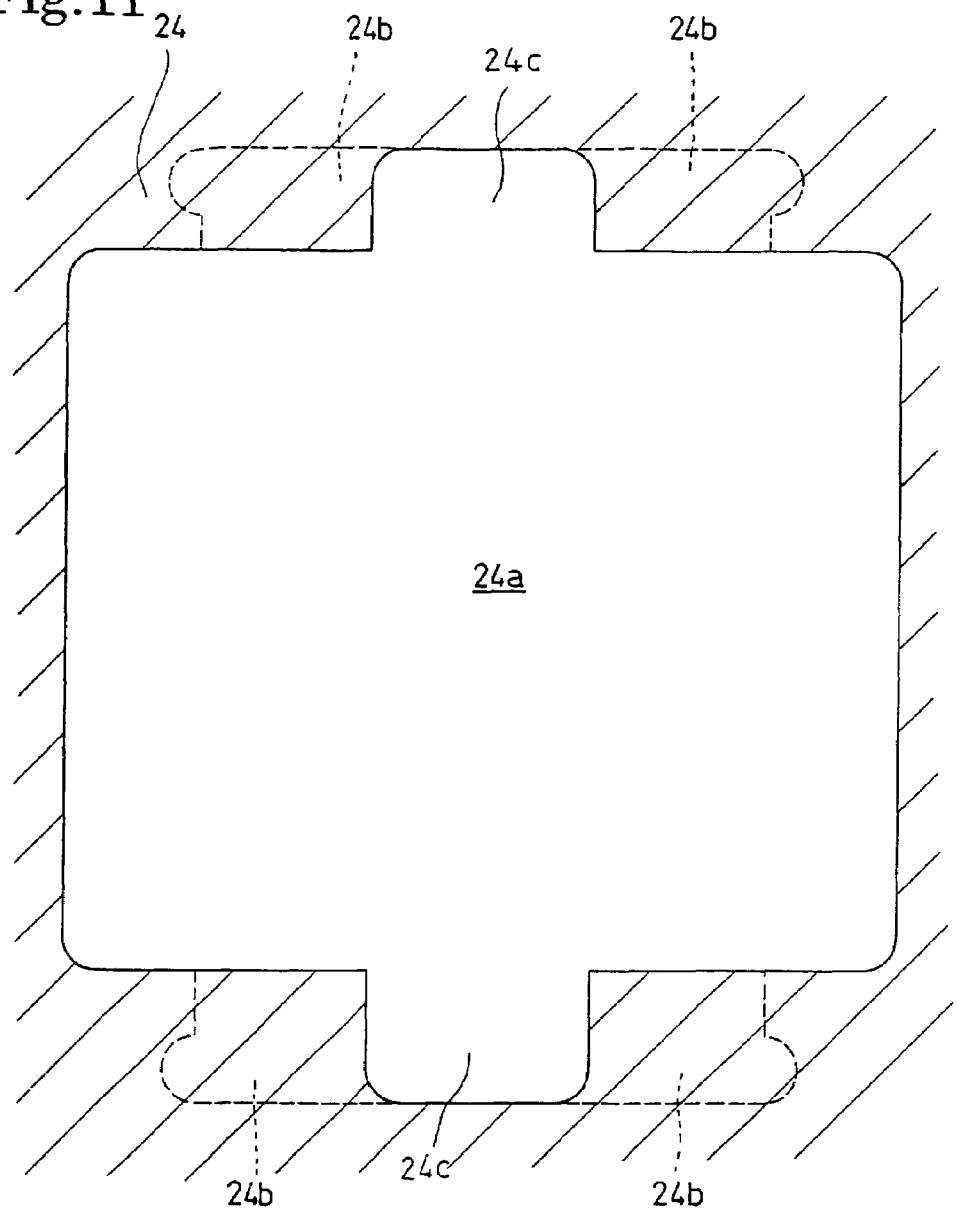
FIG. 11 is a plan view of a part provided with an opening of the wood board of the table.
Figure 26:
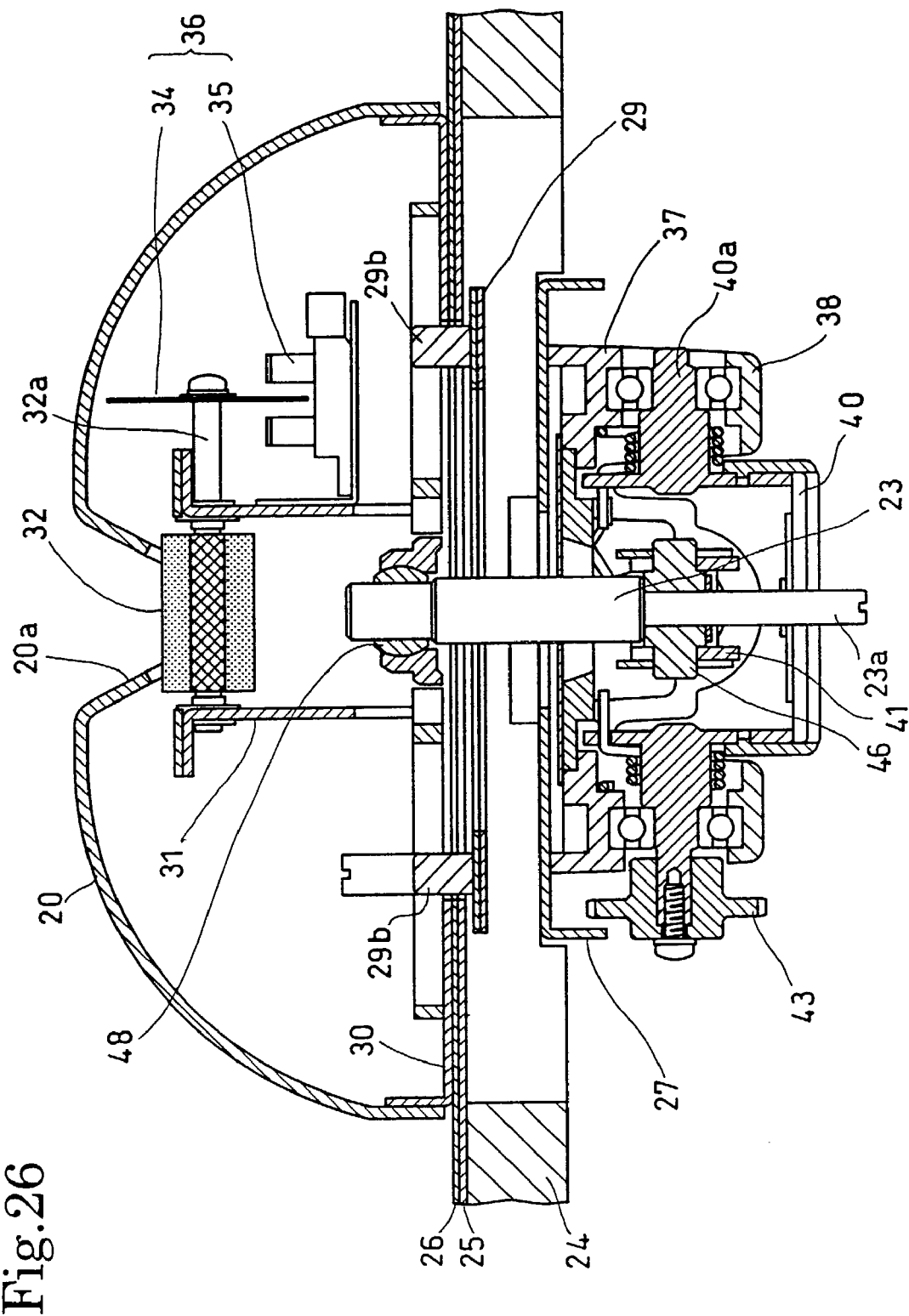
FIG. 26 is a sectional view of a combination of a bridge horizontal-slide unit and the bridge position measuring unit.
Figure 27:
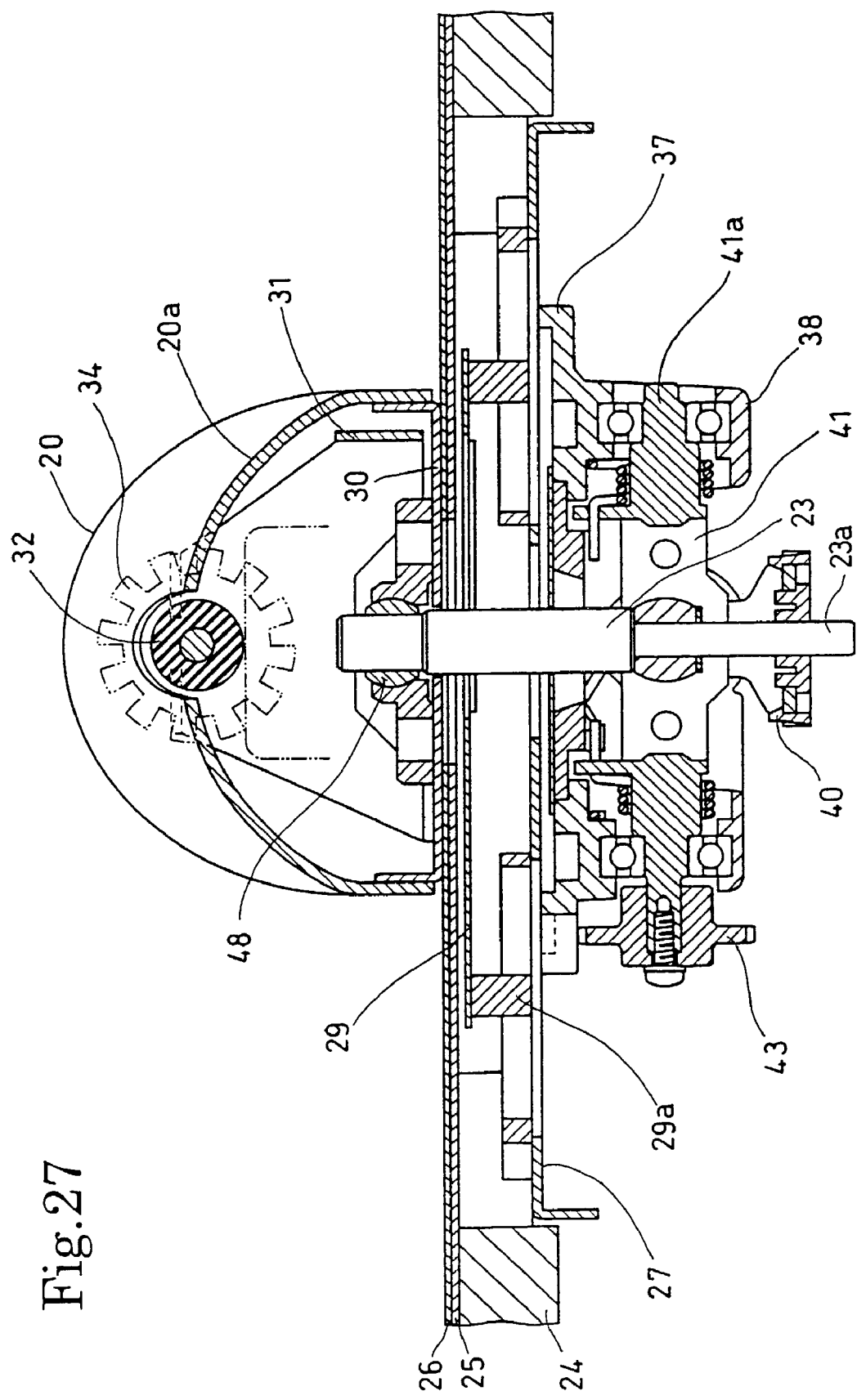
FIG. 27 is a sectional view of the combination of the bridge horizontal-slide unit and the bridge position measuring unit.

Referring to FIGS. 7, 26 and 27, the dummy billiard table 7 is made up of a wood plate 24, a metal plate 25 and a synthetic resin plate 26 superposed in that order. As shown in FIGS. 5, 7, 11 and 12, a square opening 24a provided with recesses 24c in middle parts of its front and back sides is formed in a front laterally middle part of the wood plate 24 of the dummy billiard table 7. As shown in FIG. 11, depressions 24b are formed in the lower surface of the wood plate 24 along the front and the back side of the square opening 24a. A base plate 27 is fitted in the depressions 24b. As shown in FIG. 11, the depressions 24b coincide with the recesses 24c, respectively.

Figure 13:
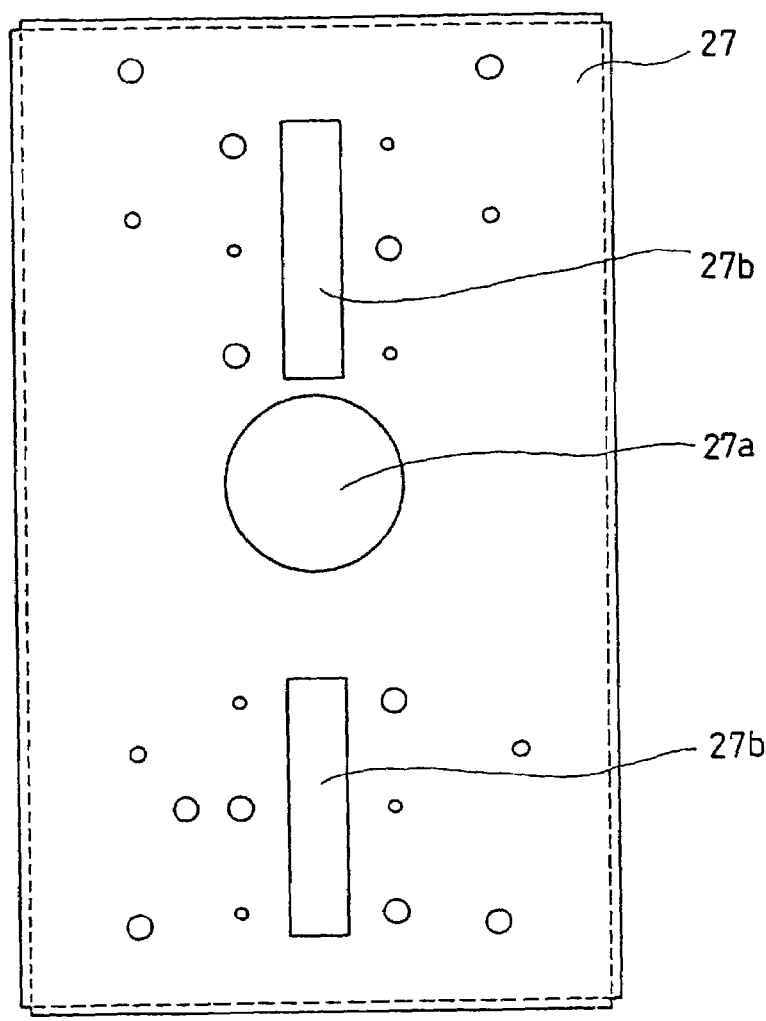
FIG. 13 is a plan view of a base plate.
Figure 14:
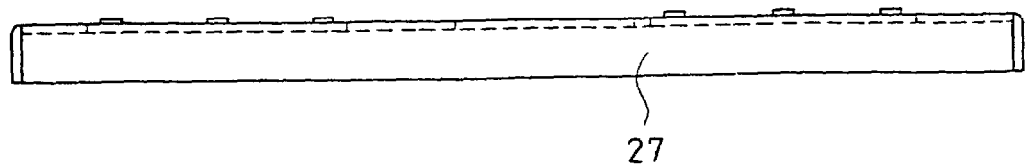
FIG. 14 is a side elevation of the base plate.
Figure 15:
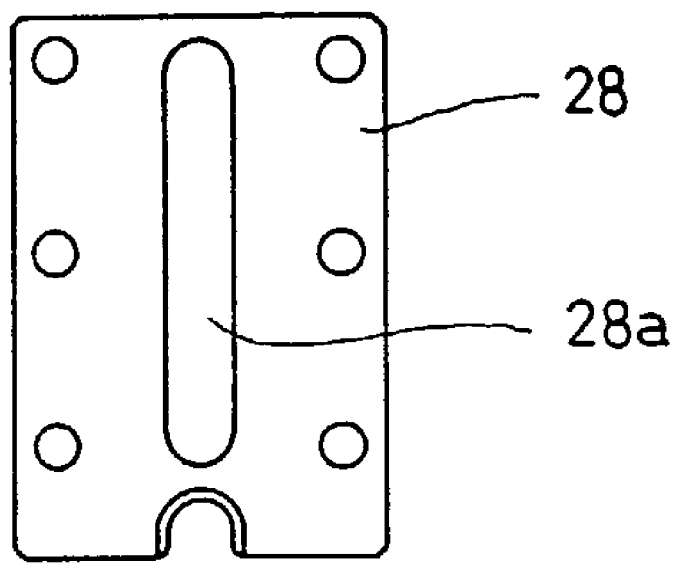
FIG. 15 is a plan view of a guide plate.
Figure 16:
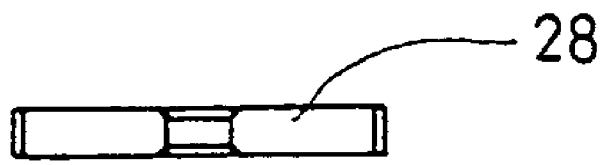
FIG. 16 is a front elevation of the guide plate.
Figure 17:
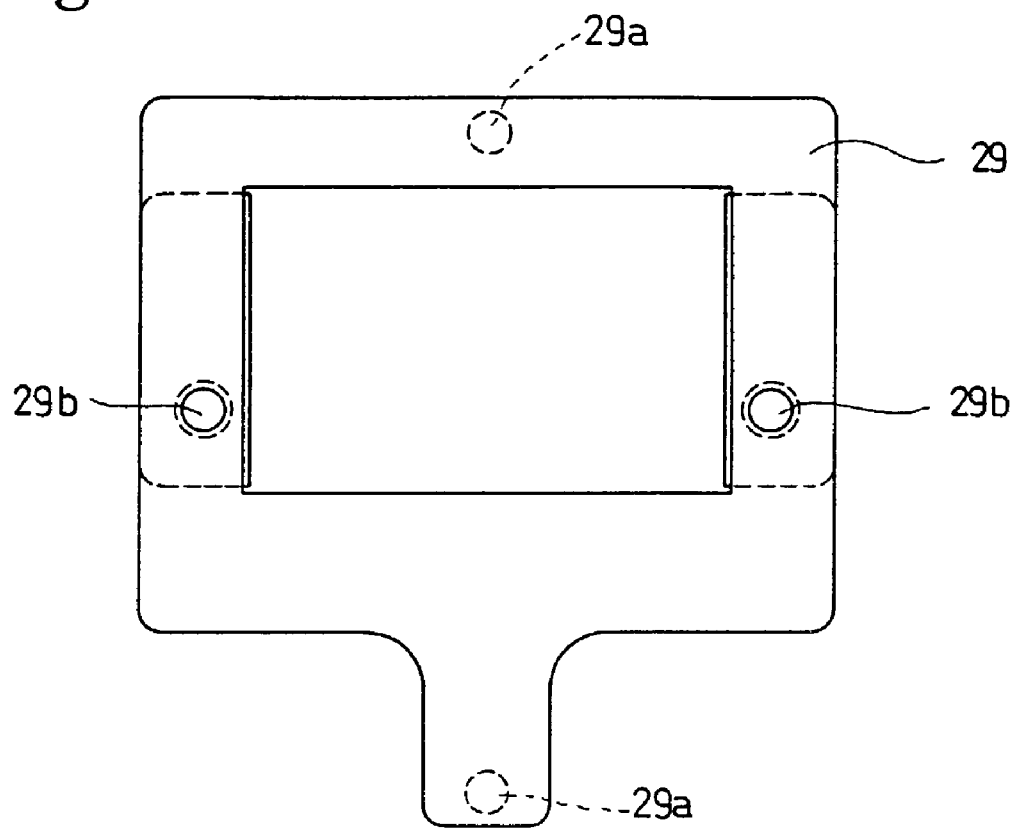
FIG. 17 is a plan view of a longitudinal slide plate.
Figure 18:
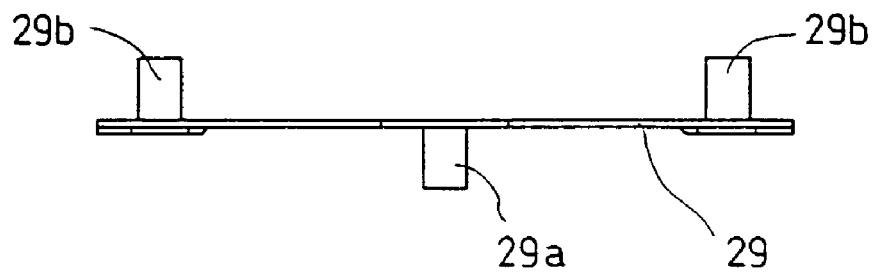
FIG. 18 is a front elevation of the longitudinal slide plate.

As shown in FIG. 13, the base plate 27 disposed under the dummy billiard table 7 is provided with a round hole 27a in its central part, and a longitudinal slots 27b on the longitudinally opposite sides, respectively, of the round hole 27a. Guide plates 28 shown in FIGS. 15 and 16 are attached to the upper surface of the base plate 27 so as to cover the slots 27b. A longitudinal slide plate 29 provided with guide pins 29a as shown in FIGS. 17 and 18 is placed on the guide plates 28 with the guide pins 29a thereof engaged slidably in guide grooves 28a formed in the guide plates 28. The guide plates 28 and the slide plate 29 are received in the square opening 24a of the wood plate 24.

Figure 19:
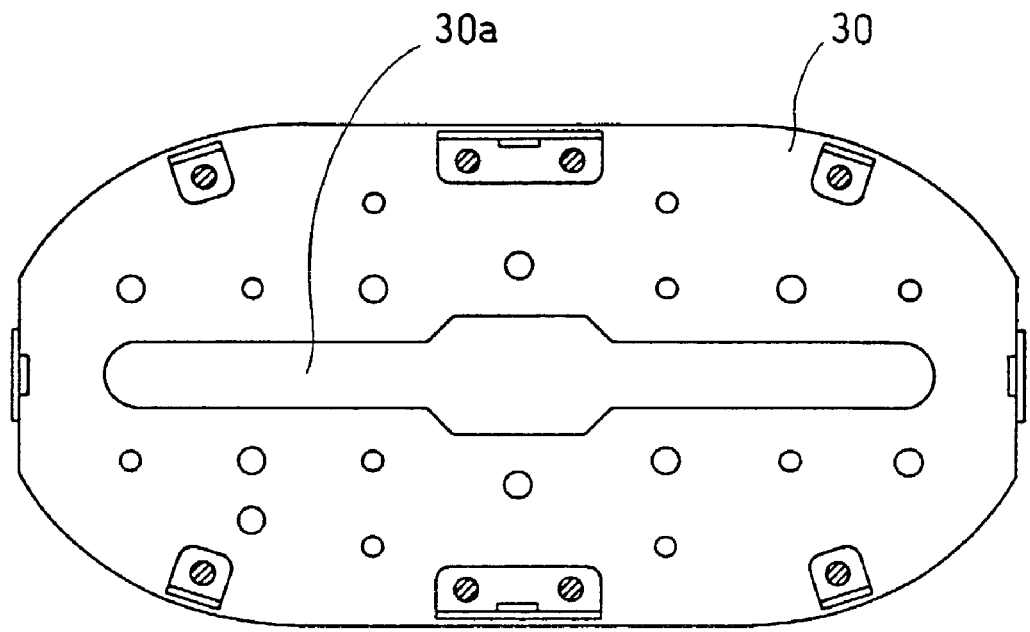
FIG. 19 is a plan view of a bottom plate.
Figure 20:
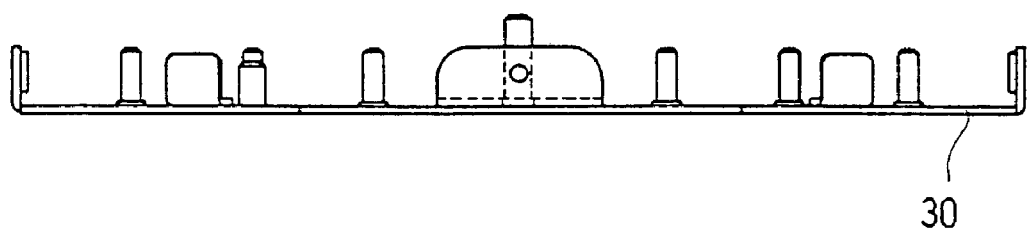
FIG. 20 is a front elevation of the bottom plate.

As shown in FIGS. 19 and 20, a bottom plate 30 placed on the dummy billiard table 7 and having an oval shape is provided with a lateral slot 30a in its longitudinally middle part. As shown in FIG. 7, two guide plates 28 are attached to the upper surface of the bottom plate 30 so as to cover right and left parts, respectively, of the lateral slot 30a. Right and left guide pins 29b projecting upward from the longitudinal slide plate 29 are engaged movably in guide slots 28a formed in the guide plates 28, respectively. The bottom plate 30 is able to move laterally relative to the slide plate 29.

Figure 21:
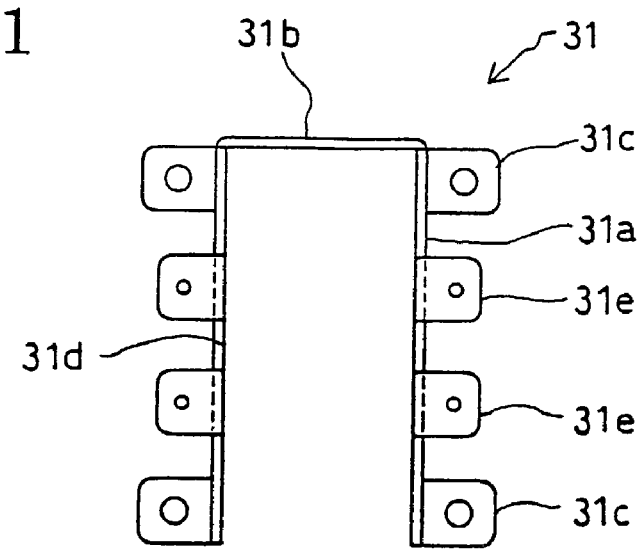
FIG. 21 is a plan view of a support bracket.
Figure 22:
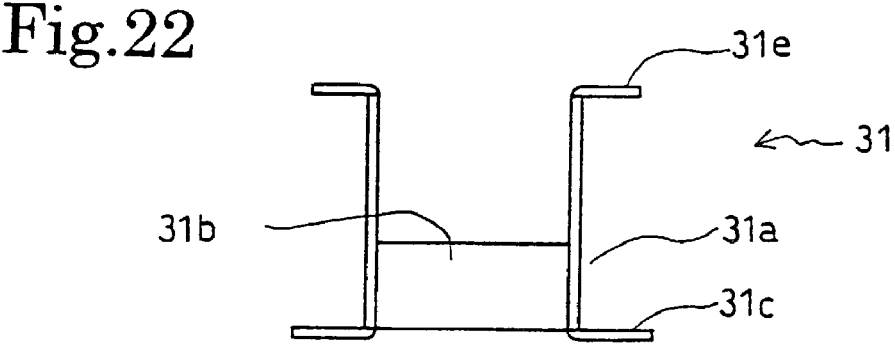
FIG. 22 is a front elevation of the support bracket.
Figure 23:
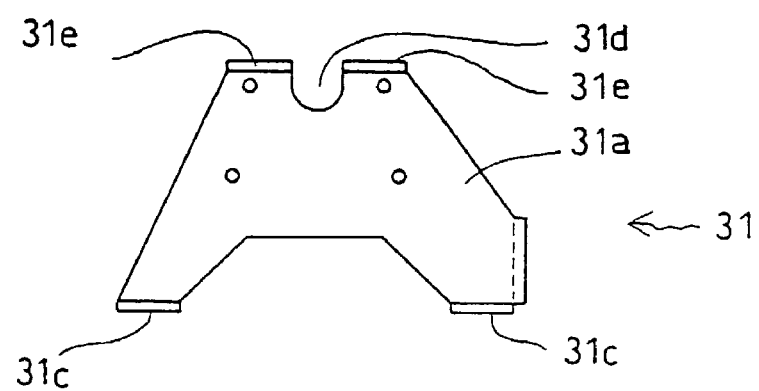
FIG. 23 is a side elevation of the support bracket.

A support brackets 31 has a U-shape in a plan view as shown in FIG. 21 and has right and left leg parts 31a, a back connecting part 31b connecting the right and left leg parts 31a, lower lugs 31c, and upper lugs 31e. The lower lugs 31c are right and left legs 31a straddle the guide plates 28, and the lower lugs 31c are attached to the upper surface of the bottom plate 30. Recesses 31d are formed in the upper edges of the right and left leg parts 31a. Shafts 32a axially projecting from the opposite ends of a cue support roller 32 are placed in the recesses 31d, respectively. Holding plates 33 are attached to the upper lugs 31e. A toothed wheel 34 is fixedly mounted on a left end part of the cue support roller 32. A sensor 35 provided with a light emitting device and a light receiving device is attached to the left leg part 31a. The toothed wheel 34 and the sensor 35 constitute a rotary encoder 36. The rotary encoder 36 measures the amount of turning of the toothed wheel 34, namely, the angle of turning of the cue support roller 32.

The bridge position measuring unit 22 shown in FIGS. 24 and 25 will be described. The bridge position measuring unit 22 has a box formed by attaching a bearing cover 38 to the lower surface of an upper base 37. base 37 is provided with substantially semicylindrical bearing holding recesses 37a and 37b in its lower right and left parts and lower front and back parts, respectively, and a round opening 37c in its central part. The bearing cover 38 is provided with substantially semicylindrical bearing holding recesses 38a and 38b in its upper right and left parts and upper front and back parts, respectively. In FIGS. 24 and 25, the arrows F indicate a forward direction.

The base 37 and the bearing cover 38 are joined together one on top of the other. Bearings 39 are held in the right and left bearing holding recesses 37a and 38a, and shafts 40a of a longitudinal swing member 40 are supported in the bearings 39 so that the longitudinal swing member 40 is able to swing in a longitudinal, vertical plane. Bearings 39 are held in the front and back bearing holding recesses 37b and 38b, and shafts 41a of a lateral swing member 41 are supported in the bearings such that the lateral swing member 41 is able to swing in a lateral, vertical plane. The longitudinal swing member 40 and the lateral swing member 41 are urged continuously toward their neutral positions by the resiliences of coil springs 42 having opposite ends engaged with the longitudinal swing member 40 and the lateral swing member 41, the base 37 and the bearing cover 38, respectively.

Segment gears 43 are fixedly mounted on the respective shafts 40a and 41a of the longitudinal swing member 40 and the lateral swing member 41, respectively. A longitudinal position measuring encoder 44 and a lateral position measuring encoder 45 are attached to the bearing cover 38 so that pinions 44a and 45a respectively included in the longitudinal position measuring encoder 44 and the lateral position measuring encoder 45 are engaged with the segment gears 43, respectively.

Shafts 46 are attached to the lever 23 so as to extend laterally in opposite directions, respectively. The shafts 46 are supported for turning in a substantially longitudinally middle part of the lateral swing member 41 for turning in a longitudinal vertical plane. A lower part 23a of the lever 23 is slidably engaged in a guide slot 40b formed in the longitudinal swing member 40. Turning of the lever 23 in a longitudinal vertical plane turns the longitudinal swing member 40 in a longitudinal vertical plane, and the longitudinal position measuring encoder 44 measures the angle of longitudinal turning of the longitudinal swing member 40. Turning of the lever 23 in a lateral vertical plane turns the lateral swing member 41 in a lateral vertical plane, and the lateral position measuring encoder 45 measures the angle of lateral turning of the lateral swing member 41.

A stopper disk 47 is attached to the base 37 so as to cover the round opening 37c. A universal joint 48 is axially slidably mounted on an upper end part of the lever 23 and is attached to the bottom plate 30.

Figure 28:
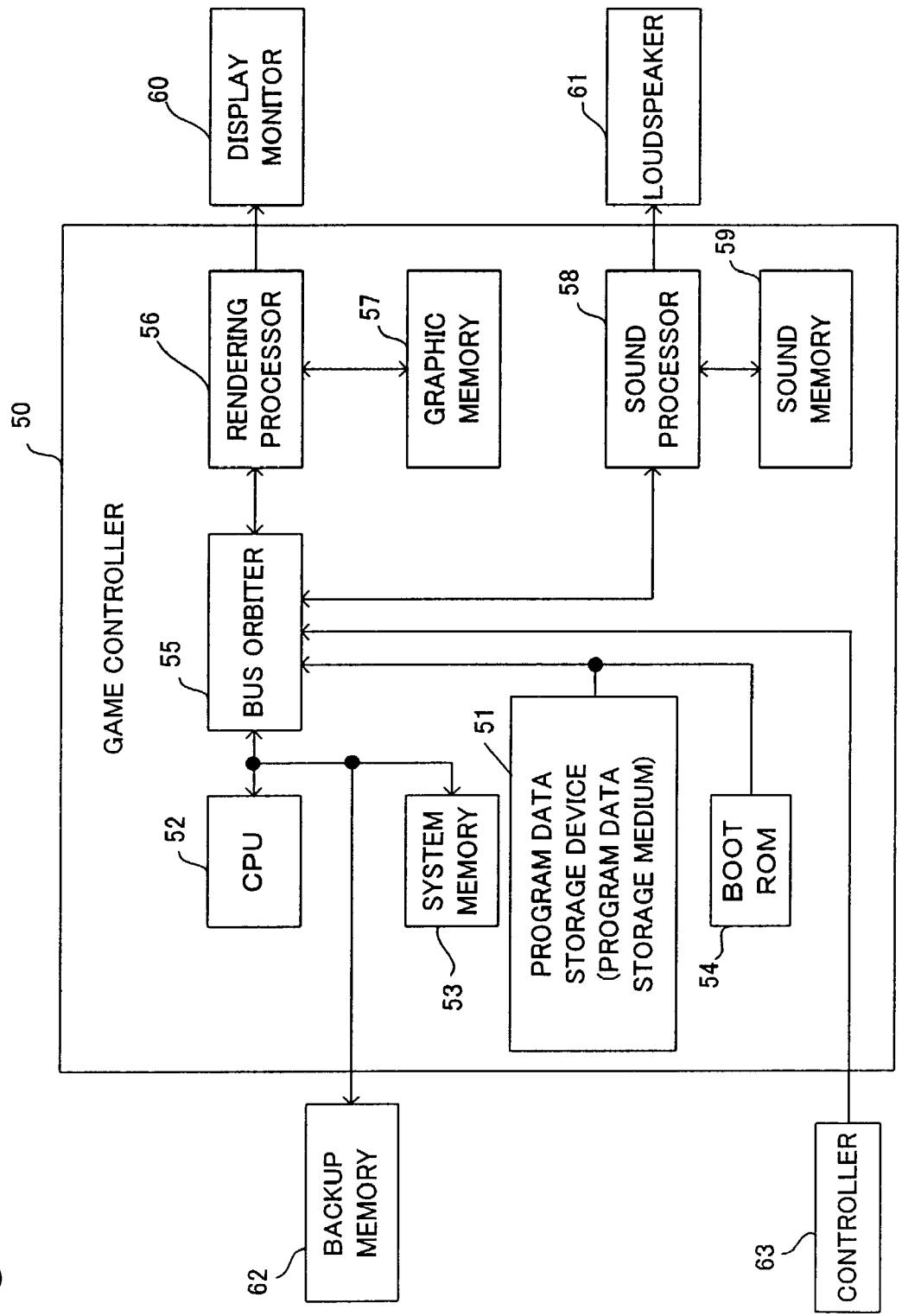
FIG. 28 is a block diagram of the billiard game machine in the first embodiment.
Figure 29:
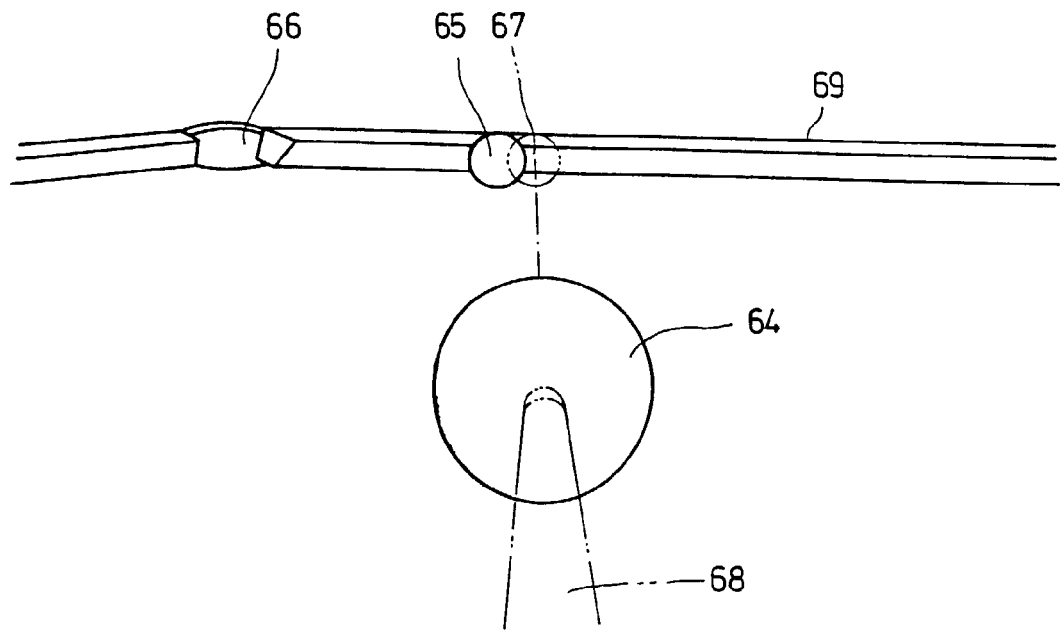
FIG. 29 is an oblique view of a billiard table while a billiard game is in progress, displayed on the screen of a display.
Figure 30:
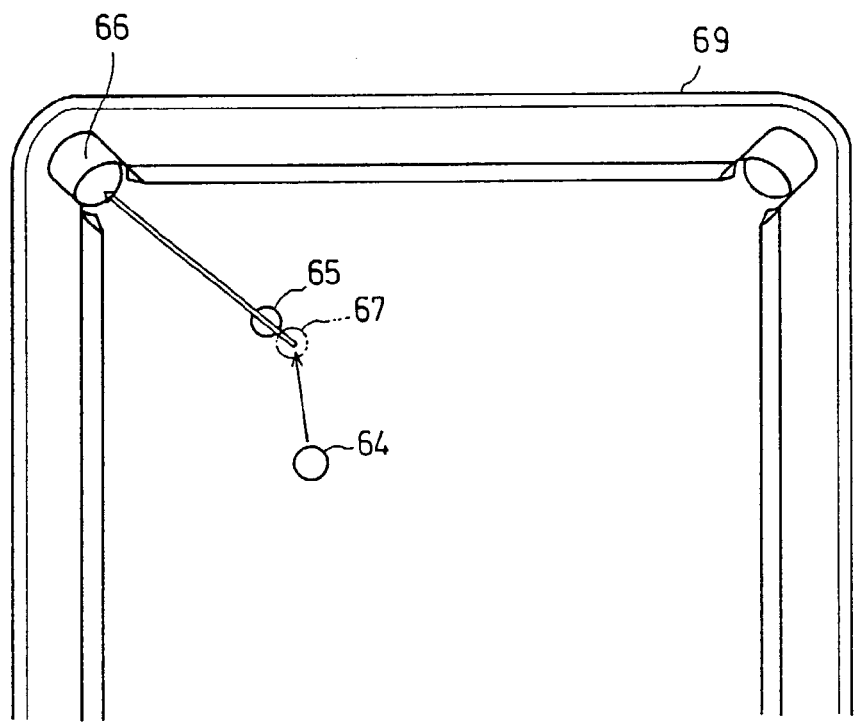
FIG. 30 is a top view of the billiard table while the billiard game is in progress, displayed on the screen of the display.

A game controller 50 disposed in the cabinet 2 controls the operation of the billiard game machine 1. Referring to FIG. 28, the game controller 50 comprises a program data storage device 51, a CPU 52, a system memory 53, a boot ROM 54, a bus orbiter 55, a rendering processor 56, a graphic memory 57, a sound processor 58, a sound memory 59, and a bus connecting those components.

Figure 31:
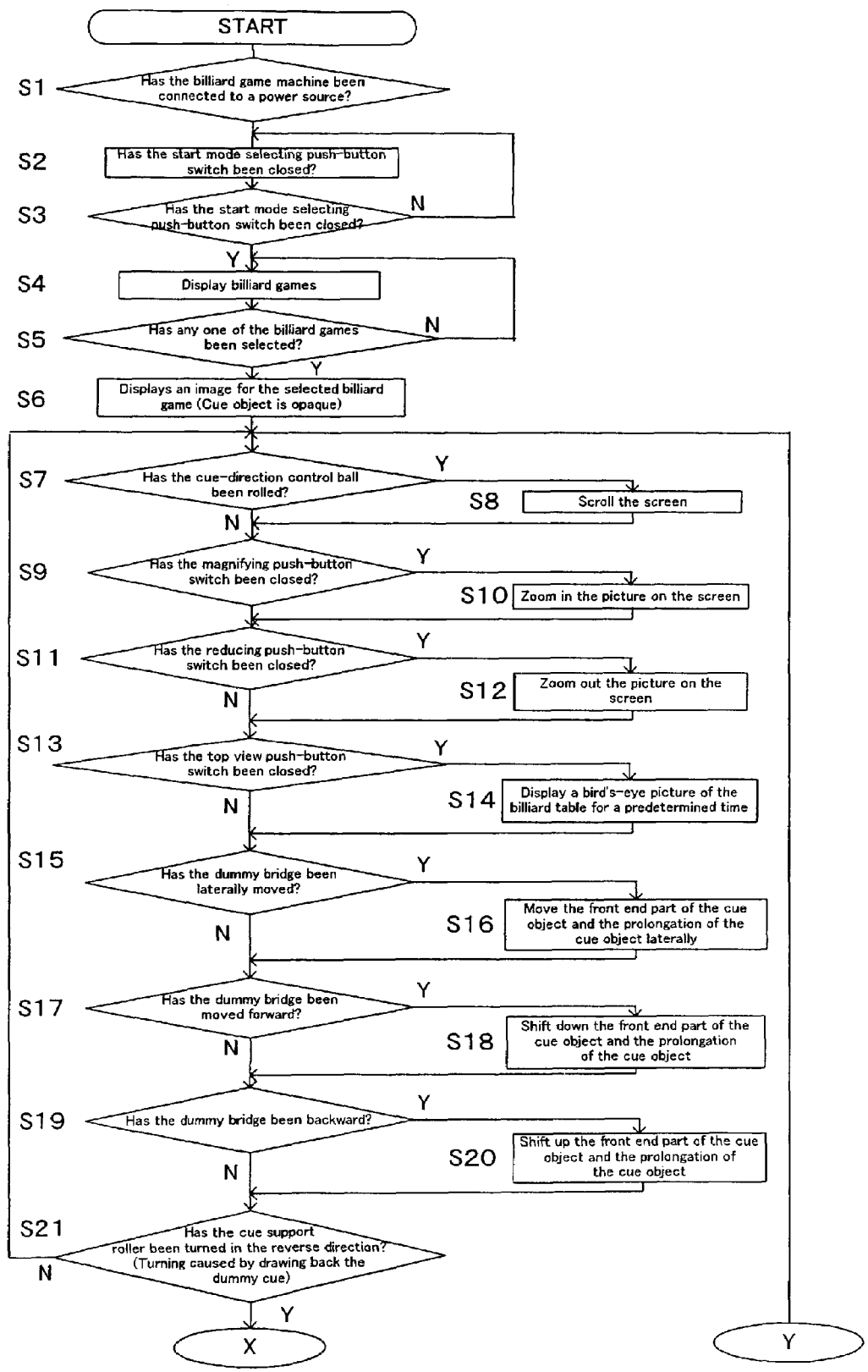
FIG. 31 is a flow chart of the first half of a game program to be carried out in the first embodiment.
Figure 32:
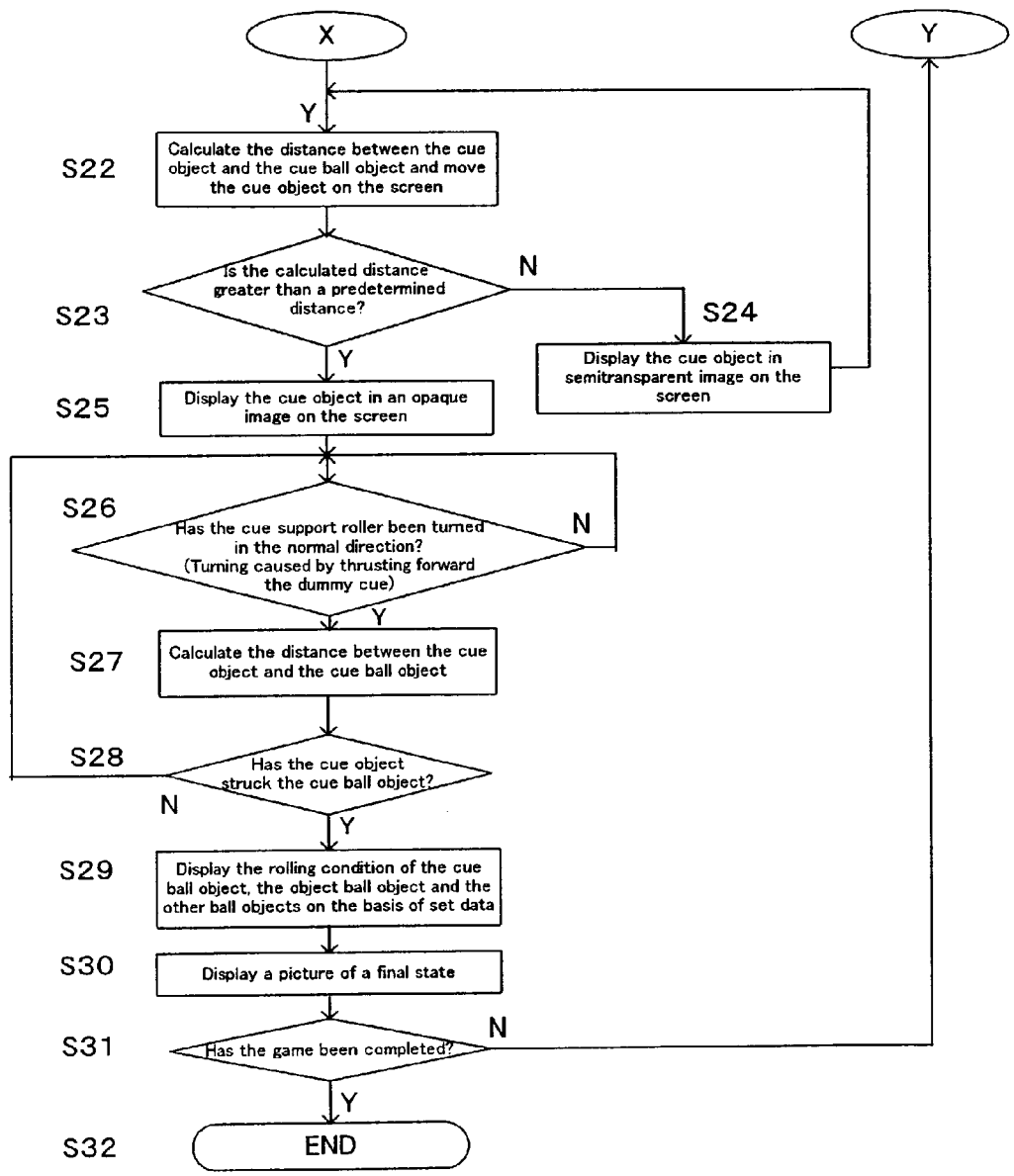
FIG. 32 is a flow chart of the second half of the game program.

The program data storage device 51 stores a plurality of billiard game programs including an eightball game program and a nineball game program, a game execution program for executing a game program shown in a flow chart in FIGS. 31 and 32, and data about images and sounds for reproducing those billiard games. The program data storage device 51 is connected to the bus orbiter 55 by the bus. The program data storage device 51 may be a program data storage medium including an optical disk and an optical disk drive. Such a program data storage medium can be optionally loaded into and unloaded from the game controller 50 to execute various kinds of billiard games.

The CPU 52 executes the billiard game program, controls the entire system and calculates coordinates to display images. The system memory 53 stores programs and data necessary for the CPU 52 to carryout operations. The boot ROM 54 stores programs and data necessary for starting the game controller 50. The bus orbiter 55 controls the flow of programs and data provided by the components of the game controller 50 and a controller 63, which will be described later.

The rendering processor 56 sends image data read from the program data storage device 51, operation data provided by the operation of the player, and image data to be generated as the game develops to a display monitor 60. The display monitor 60 displays the image to be generated. The display monitor 60 corresponds to the display 9. The graphic memory 57 stores graphic data necessary for the rendering processor 56 to generate images.

The sound processor 58 sends sound data to be generated according to the sound data read from the program data storage device 51, operation data provided by the operation of the player and the development of the game to a loudspeaker 61, and the loudspeaker 61 generates the sounds to be generated.

The game controller 50 is capable of communicating with other game controllers 50 and network servers through a modem, not shown, and a telephone circuit.

The CPU 52 and the bus orbiter 55 of the game controller 50 are connected to a backup memory 62 for recording information on the process of the billiard game, and program data transferred through the modem. The controller 63 is connected to the bus orbiter 55. The controller 63 includes a medal detector for detecting medals deposited in the medal slot 17, the cue-direction control ball 12, the start mode selecting push-button switch 13, the top view push-button switch 14, the magnifying push-button switch 15, the reducing push-button switch 16, and the rotary encoders 36, the longitudinal position measuring encoder 44 and the lateral position measuring encoder 45 of the dummy bridge 11. The controller 63 gives control signals provided by those components thereof to the game controller 50.

The game controller 50 executes the game program shown in a flow chart in FIG. 31. When the billiard game machine 1 is connected to a power source in step S1, an image of a billiard room is displayed in an imaginary three-dimensional space on the display monitor 60 in step S2. Then, the game controller 50 performs the following operations.

When the player closes the start mode selecting push-button switch 13 (step S3), a plurality of billiard games are displayed in step S4. The player selects one of the plurality of billiard games (step S5). Then, the display monitor 60 displays an image for the selected billiard game in step S6. A plurality of ball objects including object ball objects and a cue ball object on the near side, a cue object directed toward the cue ball object, and an imaginary ball object representing an object ball object that can be driven by the cue ball object into a pocket object are displayed on the screen of the display monitor 60.

When the player rolls the cue-direction control ball 12 laterally (step S7), a table object and the plurality of ball objects on the table object displayed on the screen are scrolled laterally with out changing their positional relation with the prolongation of the cue object and the cue ball object kept stationary. When the player turns the cue-direction control ball 12 longitudinally, the height of a viewing position for obtaining an image in a bird's-eye view to be displayed on the screen increases or decreases (step S8).

When the player closes the magnifying push-button switch 15 (step S9), the distance between the cue ball object and the object ball object on the screen of the display monitor 60 decreases and the image displayed on the screen of the display monitor 60 is magnified in step S10. When the player closes the reducing push-button switch 16 (step S11), the distance between the cue ball object and the object ball object displayed on the screen of the display monitor 60 increases, and the image displayed on the screen of the display monitor 60 is reduced in step S12.

When the top view push-button switch 14 is closed (step S13), an image of a billiard table as viewed from right above the billiard table is displayed to show the planar positional relation between a cue, a cue ball and an object ball precisely for a predetermined time in step S14. When the top view is displayed by operating the top view push-button switch 14, the cue object displayed on the screen of the display monitor 60 does not move even if the dummy cue 19 is moved on the dummy bridge 11.

When the player moves the dummy bridge 11 laterally from its neural position (step S15), a strike point where the prolongation of the cue object crosses the cue ball object on the screen of the display monitor 60 moves laterally. In this state, a path along which the cue ball object driven by the cue object on the screen rolls curves to the right or the left in step S16.

When the player moves the dummy bridge 11 forward from the neutral position (step S17), the strike point on the cue ball object displayed on the screen of the display monitor 60 shifts downward. Consequently, backspin is applied to the cue ball object on the screen for a draw shot in step S18.

When the player moves the dummy bridge 11 backward from the neutral position (step S19), the strike point on the cue ball object displayed on the screen of the display monitor 60 shifts upward. Consequently, the cue ball object on the screen is caused to roll forward for a follow shot in step S20.

When the player draws back the dummy cue 19 after setting the dummy cue 19 on the cue support roller 32 of the dummy bridge 11 (step S21), the rotary encoder 36 measures the angle of reverse rotation of the cue support roller 32, and the distance between the cue object and the cue ball object is calculated in step S22. In step S23, a query is made to see if the calculated distance is greater than a predetermined distance, i.e., if the distance of backward movement of the cue is greater than a predetermined value. If the distance is not greater than the predetermined distance, the cue object on the screen becomes semitransparent in step S24 and the game program returns to step S22. If the distance is greater than the predetermined distance, the cue object on the screen becomes opaque in step S25 to show the cue object clearly.

When the player thrusts forward the dummy cue 19 to turn the cue support roller 32 in the normal direction (step S26), the distance between the cue object and the cue ball object is calculated in step S27, and a query is made in step S28 to see if the cue object has struck the cue ball object. In step S29, the rolling condition of the cue ball object, the object ball object and the other ball objects is displayed on the basis of the strike point on the cue ball object at which the cue object struck the cue ball object, the moving speed and distance of movement of the dummy cue, and the positional relation between those ball objects. Then, a picture of a final state where all the ball objects have become stationary is displayed in step S30. Then, a decision is made in step S31 as to whether or not the game has been completed. The game program is ended in step S32 if the game has been completed or the game program returns to step S7 if the game has not been completed.

The cue ball object displayed by the display monitor 60, namely, the display 9, advances fast or slow according to the rotating speed of the cue support roller 32 measured by the rotary encoder 36.

In the first embodiment shown in FIGS. 1 to 35, the respective sizes of the display 9 and the dummy bridge 11, the arrangement and interval between the dummy bridge 11 and the display 9 on the dummy billiard table 7, and the height of the upper edge 8a of the cue-retaining 8 from the dummy billiard table 7 are determined such that the tip 19a of the dummy cue 19 does not hit against the screen 9a of the display 9 and is able to advance into the space 49 between the wood protective plate 10 and the dummy bridge 11 when the dummy cue 19 is thrust out with the dummy cue 19 supported on the dummy bridge 11 and rested on the upper edge 8a of the cue-retaining 8. Therefore, the tip 19a of the dummy cue 19 never hits by mistake against the screen 9a of the display 9 even if the dummy cue 19 set on the dummy bridge 11 set at the foremost position is thrust out. Thus, the destruction of the display by the dummy cue 19 operated to drive the cue ball can be prevented.

Since the cue-retaining member 8 rises from the periphery of the dummy billiard table 7, the dummy cue 19 is prevented from dropping off the dummy billiard table 7 by the cue-retaining member 8 to avoid the breakage of the dummy cue 19.

Since the billiard game does not start on the screen of the display monitor 60 unless the player sets the dummy cue 19 on the dummy bridge 11 and draws back the dummy cue 19 by a predetermined distance, the player has a playing sensation similar to that the player would have in actually playing billiards.

A picture of a situation where the player moves to determine a standing position so that the object ball is on a prolongation of a line between the cue ball and the player, and sets a finger bridge in actually playing billiards can be displayed on the screen of the display monitor 60, namely, the screen 9a of the display 9, by longitudinally and laterally rolling the cue-direction control ball 12, so that the player is able to have a sensation of actually moving to a standing position on a prolongation of the line connecting the cue ball and the object ball.

Figure 33:
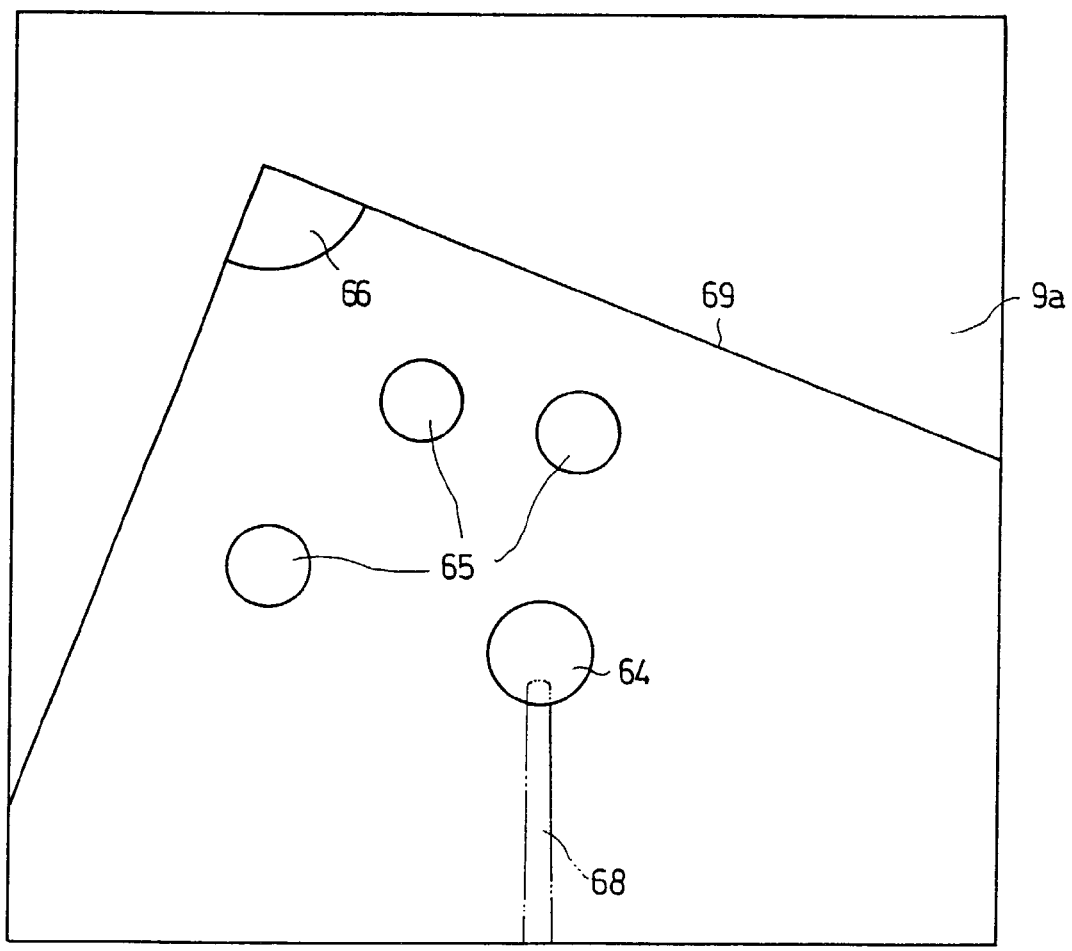
FIG. 33 is a pictorial view of assistance in explaining the arrangement of various objects displayed on the screen of the display.
Figure 34:
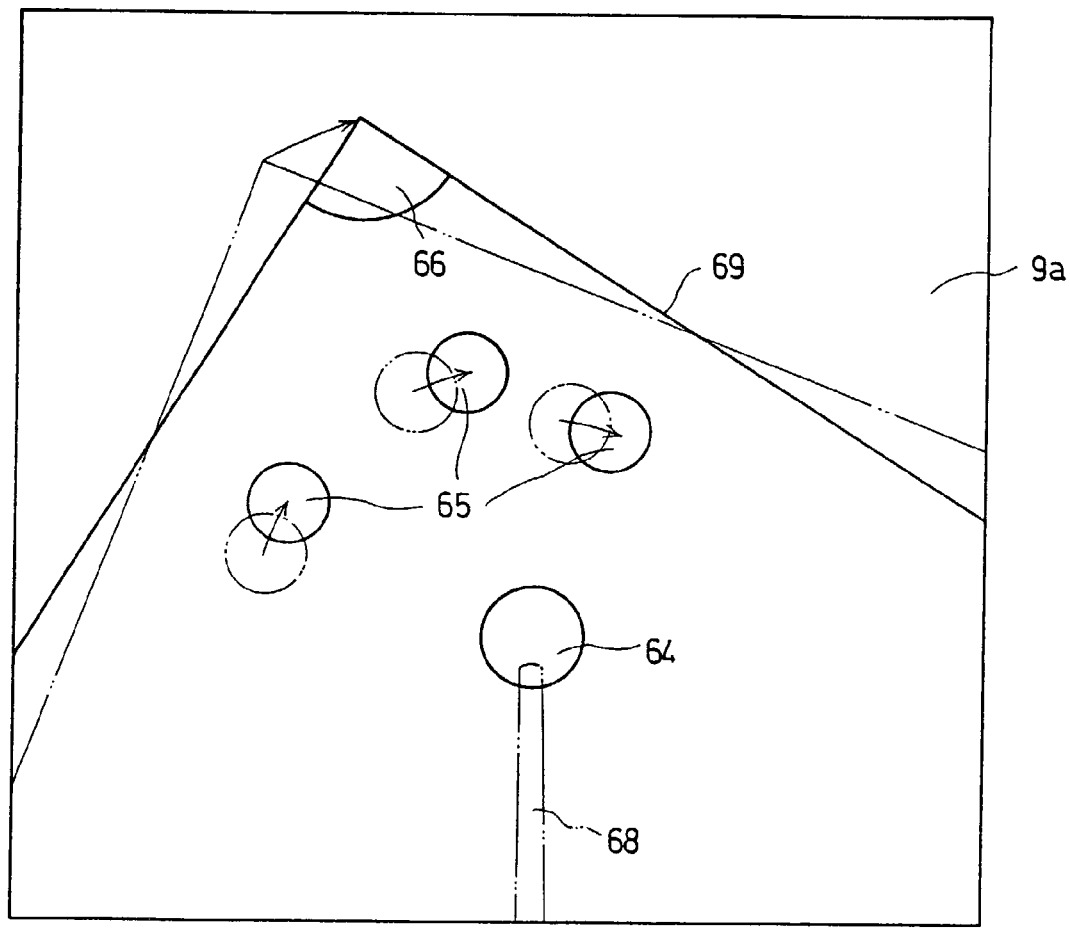
FIG. 34 is a pictorial view of assistance in explaining the arrangement of various objects displayed on the screen of the display when a cue-direction control ball is turned in a lateral plane.
Figure 35:
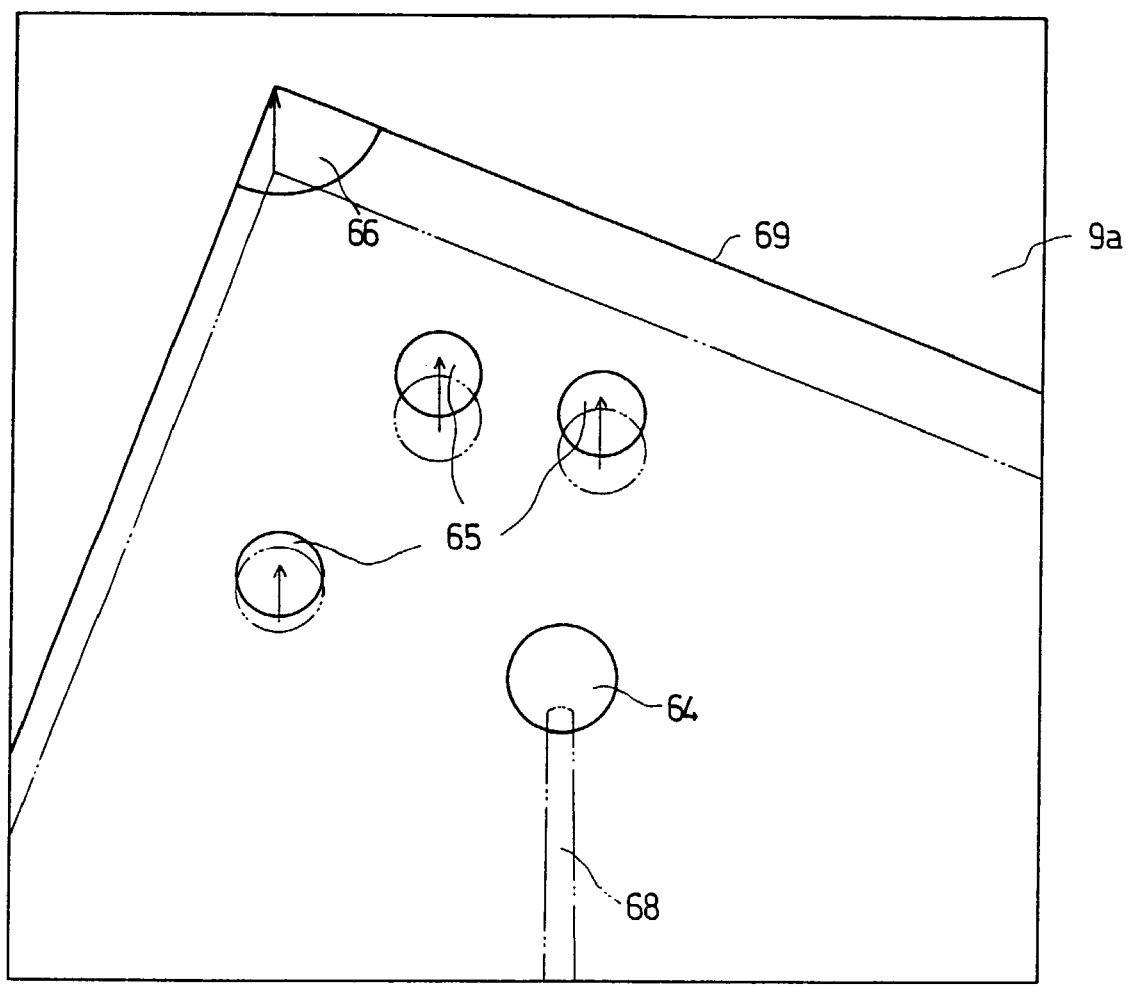
FIG. 35 is a pictorial view of assistance in explaining the arrangement of various objects displayed on the screen of the display when the cue-direction control ball is turned in a longitudinal plane.

More concretely, when the player rolls the cue-direction control ball 12 to the left, object ball objects 65, a pocket object 66 and a table object 69 displayed on the screen 9a of the display 9 as shown in FIG. 33 are turned to the right about a cue ball object 64 without changing the direction of a cue object 68 to positions indicated in a picture shown in FIG. 34. This turning movement of the object ball objects 65, the pocket object 66 and the table object 69 is equivalent to the leftward turning of the directions of the player and the cue object 68 with the object ball objects 65, the pocket object 66 and the table object 69 fixed.

When the player rolls the cue-direction control ball 12 backward, the cue ball object 64, the object ball objects 65, the pocket object 66, the cue object 68 and the table object 69 displayed on the screen 9a of the display 9 as shown in FIG. 33 are not turned laterally, and a picture obtained by changing the viewing direction for obtaining a bird's-eye view, i.e., changing the viewing direction from a substantially horizontal direction to a substantially vertical direction, is displayed.

When the player closes the reducing push-button switch 16, a picture of the cue ball and the object ball seen from a remote position is displayed on the screen 9a of the display 9. When the player closes the magnifying push-button switch 15, a picture of the cue ball and the object ball seen from a position close to the cue ball can be displayed on the screen 9a of the display 9. Thus, the player is able to have a sensation similar to that the player would have when the player sets a cue toward a cue ball in an actual billiards.

When the player closes the top view push-button switch 14, a picture obtained by viewing the billiard table from right above the billiard table is displayed on the screen 9a of the display, which enables the player to have an accurate grasp of the positional relation between the cue ball and the object ball.

In a state where the dummy cue 19 is set on the cue support roller 32 of the dummy bridge 11 and the dummy cue 19 has not yet been drawn back by the predetermined distance, a front end part f the cue object displayed on the screen 9a of the display 9 is semitransparent. Therefore, a point of contact of the cue ball and the tip of the cue is shown clearly, which facilitates aiming at the cue ball.

When the dummy cue 19 is set on the cue support roller 32 of the dummy bridge 11 and the dummy cue 19 is drawn back by a distance greater than the predetermined distance, the semitransparent object of the front end part of the cue becomes opaque to show a picture simulating an actual game of billiards.

When the cue-direction control ball 12 is operated properly, the cue object on the screen 9a of the display 9 is set in a proper direction, the dummy bridge 11 is positioned properly, the cue object is positioned properly relative to the cue ball object on the screen 9a of the display 9, and the dummy cue 19 set on the cue support roller 32 of the dummy bridge 11 is advanced at a proper speed, the controller 63 sends data on such a proper condition to the game controller 50. The data is subjected to calculation together with image data held by the game controller 50. Then, a picture of a successful shot indicating the collision of the cue ball object against the object ball object, the rolling of the object ball object, toward the pocket object and the dropping of the object ball object into the pocket object is displayed in an imaginary three-dimensional space on the screen 9a of the display 9.

An imaginary ball object 67 is displayed in addition to a cue ball object 64, an object ball object 65 and a pocket object 66 on the screen 9a of the display 9 when a game mode for a beginner is selected by operating the starting mode selecting push-button switch 13. Therefore, even an beginner incapable of imagining an imaginary ball whose position is dependent on the positional relation between an object ball and a pocket is able to achieve a successful shot provided that the beginner is able to drive the cue ball object 64 correctly toward the imaginary ball object 67 displayed on the screen 9a of the display 9, which enhances the player's interest.

In the first embodiment, since the semitransparent cue object is replaced with the opaque cue object after the dummy cue 19 set on the dummy bridge 11 has been drawn back by the predetermined distance and a condition permitting the striking action of the cue object on the screen of the display monitor 60 has been set, the player is able to know the condition permitting the striking action of the cue object from the picture displayed on the screen of the display monitor 60. The player may be notified of the establishment of this condition by a picture displayed on the screen of the display monitor 60 or by sounds.

In the first embodiment shown in FIGS. 1 to 35, the table object 69 and the object ball objects 65 placed on the table object 69 can be turned to the right or left about the cue ball object 64 by turning the cue-direction control ball 12 laterally, and the height of a viewing position for obtaining the images of the objects 64, 65, 66, 67, 68 and 69 in a bird's-eye view to be displayed on the screen 9a can be changed by longitudinally turning the cue-direction control ball 12. Therefore, the cue ball object 64 cannot optionally be placed at a desired position on the table object 69 when a rival player operated the dummy cue improperly and could not make the cue ball hit against the object ball or when the cue ball was driven into the pocket (scratch) while the billiard game is in progress.

Figure 36:
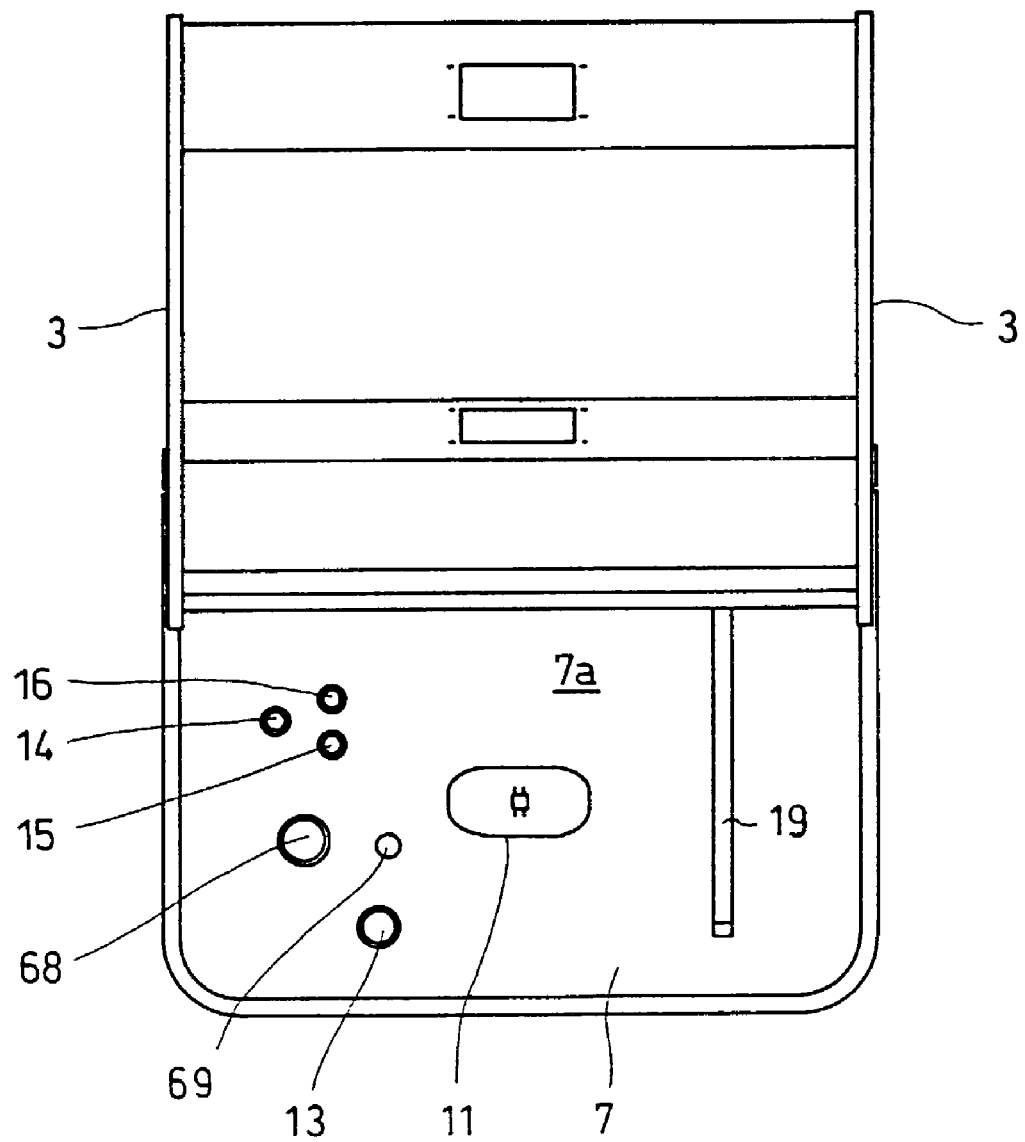
FIG. 36 is a plan view of a billiard game machine in a second embodiment according to the present invention.

FIG. 36 shows a billiard game machine in a second embodiment according to the present invention intended to solve such a problem. The billiard game machine in the second embodiment may be provided on a dummy billiard table 7 with a track ball 70 and a viewing point shifting button 71 instead of the due-direction control ball 12, and may carry out the following operations.

Figure 37:
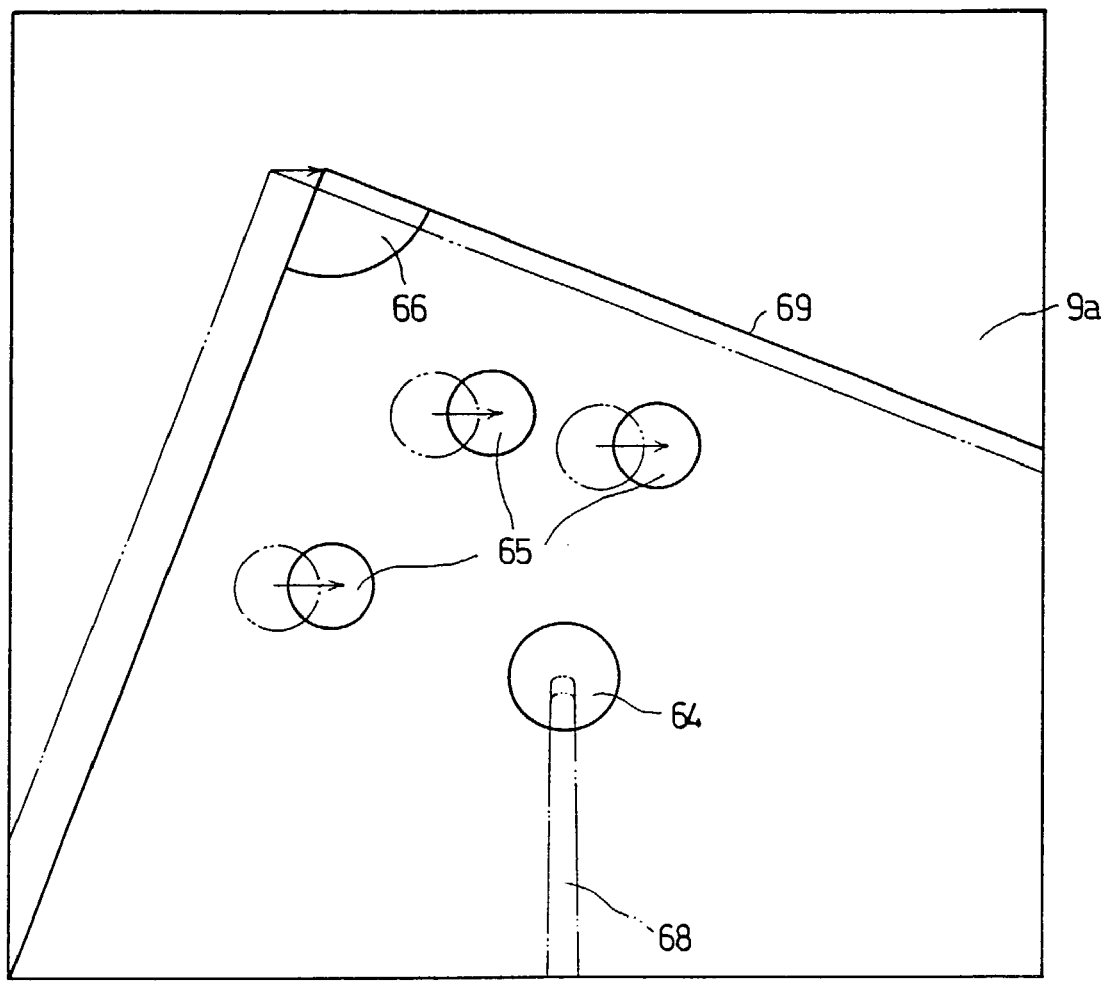
FIG. 37 is a pictorial view of assistance in explaining the arrangement of various objects displayed on the screen of a display when a track ball is turned in a lateral plane.

When the viewing point shifting button 71 is not depressed and the track ball 70 is turned to the left, the arrangement of objects 64, 65, 66, 68 and 69 as shown in FIG. 33 changes; the cue ball object 64 and the cue object 68 are kept fixed, and the object ball objects 65, the pocket object 66 and the table object 69 are shifted to the right by a distance corresponding to the angle of turning of the track ball 70 as shown in FIG. 37.

Figure 38:
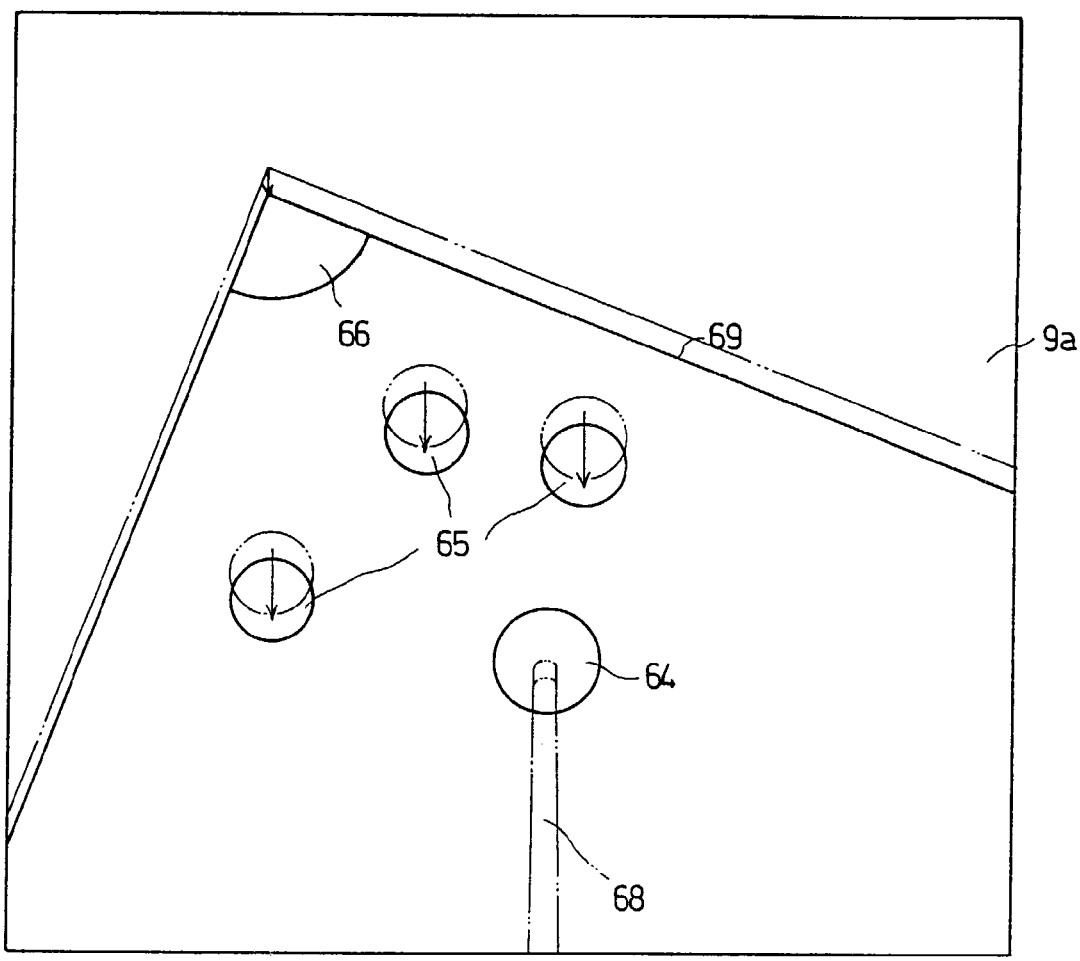
FIG. 38 is a pictorial view of assistance in explaining the arrangement of various objects displayed on the screen of the display when the track ball is turned in a longitudinal plane.

When the viewing point shifting button 71 is not depressed and the track ball 70 is turned forward, the arrangement of the objects 64, 65, 66, 68 and 69 as shown in FIG. 33 changes; the cue ball object 64 and the cue object 68 are kept fixed, and the object ball objects 65, the pocket object 66 and the table object 69 are shifted forward by a distance corresponding to the angle of turning of the track ball 70 as shown in FIG. 38. When the track ball 70 is turned in a diagonal direction, the object ball objects, 65, the pocket object 66 and the table object 69 can be shifted in the direction of the resultant vector of a lateral component vector and a longitudinal component vector.

The operation of the game machine in the second embodiment is the same as that of the game machine in the first embodiment shown in FIGS. 1 to 35, when the track ball 70 is turned laterally or longitudinally with the viewing point shifting button 71 depressed.

Thus, the second embodiment shown in FIGS. 36 to 38 is able to perform an operation for moving the cue ball object 64 and the cue object 68 on the screen 9a in addition to those of operations of the first embodiment shown in FIGS. 1 to 35.

In the first embodiment shown in FIGS. 1 to 35 and the second embodiment shown in FIGS. 36 to 38, the moving direction of the object ball object 65, the pocket object 66, the imaginary ball object 67 and the table object 69 on the screen 9a corresponding to the turning directions of the cue-direction control ball 12 and the track ball 70 may be reversed.

In the first embodiment shown in FIGS. 1 to 35 and the second embodiment shown in FIGS. 36 to 38, the cue object 68 displayed on the screen 9a of the display 9 extends backward from the lower edge 9c of the screen 9a perpendicularly to the lower edge 9c, which gives a sensation different from that will be given by actual billiards.

Figure 39:
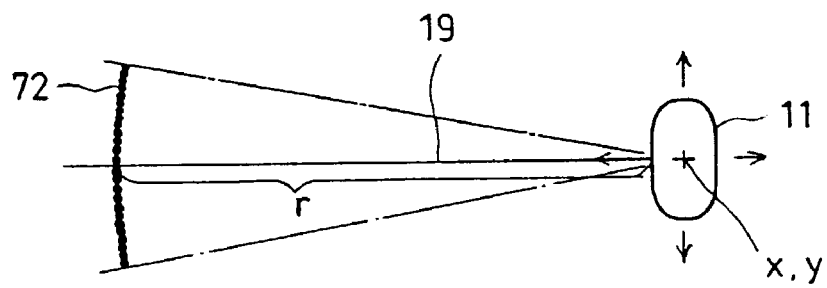
FIG. 39 is a plan view of a part around a dummy bridge of a dummy billiard table included in a third embodiment of the present invention.
Figure 40:
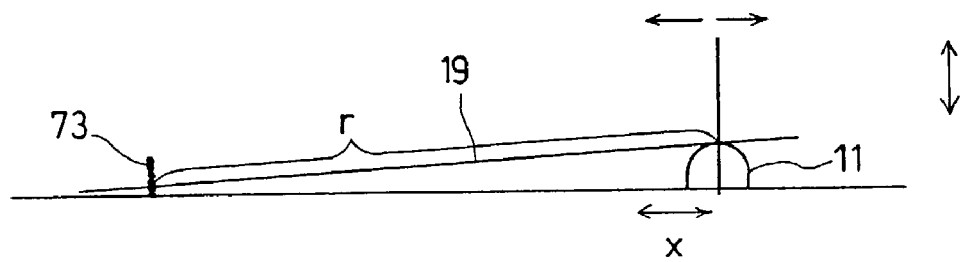
FIG. 40 is a side elevation of a part around the dummy bridge of the dummy billiard table included in the third embodiment.

A billiard game machine in a third embodiment according to the present invention shown in FIGS. 39 and 40 is intended to solve this problem. In the billiard game machine in the third embodiment, a plurality of direction sensors 72 for determining the direction of a dummy cue 19 in a horizontal plane and a plurality of inclination sensors 73 for determining the inclination of the dummy cue 19 are arranged at equal intervals along a circular arc of a circle of a radius r having its center at the top of a cue support roller 32 of a dummy bridge 11 on a dummy billiard table 7 and a side panel 3, respectively. A game controller 50 calculates the direction of the dummy cue 19 on the dummy billiard table 7 on the basis of a position indicated by X and Y on a horizontal plane of the dummy bridge 11, the position of the direction sensor 72 coinciding with the dummy cue 19 and the position of the inclination sensor 73 coinciding with the dummy cue 19, and displays the dummy cue 19 extended in the calculated direction on the screen 9a of a display 9.

An image forming device turns a table object 69 about a cue ball object 68 on the screen 9a when a cue-direction control ball 12 is turned, and displays a picture of the table object 69 as viewed from the position of the player relative to a billiard table.

When the dummy bridge 11 is shifted laterally or longitudinally, the image forming device shifts a bridge object, not shown, accordingly on the screen 9a.

The third embodiment shown in FIGS. 39 and 40 is capable of displaying a picture simulating a situation where a player approaches an actual billiard table, forms a bridge with the left hand on the billiard table, places a cue on the bridge and thrusts out the cue toward a cue ball to play billiards.

INDUSTRIAL APPLICABILITY

Although present invention has been described as applied to the billiard game machines in the foregoing embodiments, the present invention is applicable to a golf game machine capable of simulating playing golf in which a player addresses a golf ball set on the ground, repeats a waggle or a backswing in preparing for a shot, and then swings the golf club for a shot, and a baseball game machine capable of simulating playing baseball in which a player stands in a batter's box, does a practice swing or a backswing, and swings a bat to hit a ball.

The present invention is applicable to a game machine including a measuring means capable of measuring the quantity or speed of operation of an operating unit by a player, and of operating an object on a screen according to the quantity or speed of operation to play a game by changing the positional relation between the object controlled by the player and other objects, and a game control method, in which a range is specified for the positional relation between the player's object and the other objects, and a decision whether or not the game is to be continued is dependent on whether or not the player's object in the predetermined range.

The invention claimed is:

1. A game machine having a dummy ball-hitting member to be operated by a player, wherein a game is played based on results of a ball hitting action in which a stationary ball is hit after a preliminary backward movement of the dummy ball-hitting member by the player, said game machine comprising:

a display means for displaying images for the game;

an operating signal generating means for measuring at least one of a quantity of operation and a speed of operation of the dummy ball-hitting member by the player to generate an operation signal;

a control means that operates to display on said display means a first object representing said operating means and a second object representing the stationary ball to be hit by the first object to move the first object on the display means in response to said operation signal from the operating signal generating means, and to move the second object in an imaginary space on the display means;

said control means being configured to calculate a distance between the first object and the second object on the basis of said operation signal of at least one of the quantity of operation and the speed of operation of the dummy ball-hitting member to make a determination as to whether or not said preliminary backward movement of the dummy ball-hitting member is equal to or greater than a predetermined distance;

said control means being configured to change at least one of color, shape, size and transparency of at least one of the first object and the second object in said displayed images in response to the determination by the control means that said preliminary backward movement of the dummy ball-hitting member is equal to or greater than said predetermined distance; and said control means being further configured to make a judgment about whether the first object has struck the second object only after it is determined that said preliminary backward movement of the dummy ball-hitting member is equal to or greater than said predetermined distance.

2. The game machine according to claim 1, wherein said control means is operable to display on the display means whether said preliminary backward movement of the dummy ball-hitting member is equal to or greater than said predetermined distance.

3. An image displaying control method in which a dummy ball-hitting member is operated by a player and a game is played by a game control means on the basis of results of a ball hitting action in which a stationary ball is hit after a preliminary backward movement of the dummy ball-hitting member by the player, said image displaying control method comprising the steps of:

displaying, on a display means provided in the game control means, a first object which represents the dummy ball-hitting member, and a second object which represents the stationary ball to be hit by the first object and is moved on the basis of results of the hitting of the second object by the first object;

measuring at least one of a quantity of operation and a speed of operation of the dummy ball-hitting member by the player to generate a corresponding operation signal;

determining at least one of the quantity of operation and the speed of operation of the dummy ball-hitting member by the game control means on the basis of the corresponding operation signal;

calculating by the game control means a distance between the first object and the second object on the basis of said operation signal of at least one of the quantity of operation and the speed of operation of the dummy ball-hitting member to make a determination as to whether or not said preliminary backward movement of the dummy ball-hitting member is equal to or greater than a predetermined distance;

changing by the game control means at least one of color, shape, size and transparency of at least one of the first object and the second object in response to the determination that said preliminary backward movement of the dummy ball-hitting member is equal to or greater than said predetermined distance; and making a judgment by the game control means about whether the first object has hit or struck the second object only after it is determined that said preliminary backward movement of the dummy ball-hitting member is equal to or greater than said predetermined distance.

4. The image displaying control method according to claim 3, further comprising the step of displaying on the display means, by the game control means, the judgment containing results of the hitting of the second object by the first object when it is determined that said preliminary backward movement of the dummy ball-hitting member is equal to or greater than said predetermined distance.

5. A billiard game machine having a dummy cue to be operated by a player, wherein a billiard game is played in a three-dimensional imaginary space based on results of a ball hitting action in which a cue ball is hit by the dummy cue after a preliminary backward movement of the dummy cue by the player, said billiard game machine comprising:

a display means for displaying images for the billiard game;

an operating signal generating means for measuring at least one of a quantity of operation and a speed of operation of the dummy cue by the player to generate an operation signal;

a control means that operates to display on said display means a cue object representing said dummy cue and a cue ball object representing the cue ball to be hit by the cue object to move the cue object on the display means in response to said operation signal from the operating signal generating means, and to move the cue ball object in an imaginary space on the display means;

said control means being configured to calculate a distance between the cue object and the cue ball object on the basis of said operation signal to make a determination as to whether or not said preliminary backward movement of the dummy cue is equal to or greater than a predetermined distance;

said control means being configured to change at least one of color, shape, size and transparency of at least one of the cue object and the cue ball object on said display means in response to the determination by the control means that said preliminary backward movement of the dummy cue is equal to or greater than said predetermined distance; and said control means being further configured to make a judgment about whether the cue object has hit or struck the cue ball object only after it is determined that said preliminary backward movement of the dummy cue is equal to or greater than said predetermined distance.

6. The game machine according to claim 5, wherein said control means is operative to display on the display means whether said preliminary backward movement of the dummy cue is equal to or greater than said predetermined distance.

7. A billiard game image displaying control method in which a dummy cue is operated by a player and a billiard game is played by a game control means on the basis of results of a ball hitting action in which a cue ball is hit after a preliminary backward movement of the dummy cue by the player, said billiard game image displaying control method comprising the steps of:

displaying, on a display means provided in the game control means, a cue object which represents the dummy cue, and a cue ball object which represents the cue ball to be bit by the cue object and is moved based on the results of the hitting of the cue ball object by the cue object;

measuring at least one of a quantity of operation and a speed of operation of the dummy cue by the player to generate a corresponding operation signal;

determining at least one of the quantity of operation and the speed of operation of the dummy cue, by the game control means on the basis of the corresponding operation signal;

calculating, by the game control means, a distance between the cue object and the cue ball object based on the said operation signal to make a determination as to whether or not said preliminary backward movement of the dummy cue is equal to or greater than a predetermined distance;

changing, by the game control means, at least one of color, shape, size and transparency of at least one of the cue object and the cue ball object, in response to the determination that said preliminary backward movement of the dummy cue is equal to or greater than said predetermined distance; and making a judgment by the game control means about the whether the cue object has hit or struck the cue ball object only after it is determined that said preliminary backward movement of the dummy cue is equal to or greater than said predetermined distance.

8. The image displaying control method according to claim 7, further comprising the step of displaying on the display means, by the game control means, the judgment containing results of the hitting of the cue ball object by the cue object when it is determined that said preliminary backward movement of the dummy cue is equal to or greater than said predetermined distance.

9. A billiard game machine having a dummy billiard table, a dummy cue on the dummy billiard table, to be operated by a player, a display means provided at a back part of the dummy billiard table for displaying billiard game images which include a billiard table object, a cue object representing the dummy cue, a cue ball object representing a cue ball and object ball objects representing object balls, and a control means for carrying out a billiard game by moving said objects on the display means in accordance with operation of the dummy cue by the player, said billiard game machine comprising:

a dummy bridge disposed on the dummy billiard table for supporting the dummy cue for longitudinal back and forth movement; and an operating signal generating means provided in the dummy bridge to measure at least one of a quantity of operation and a speed of operation of the dummy cue by the player to generate an operation signal;

said control means being operative to calculate a distance between the cue object and the cue ball object on the basis of said operation signal of at least one of the quantity of operation and the speed of operation of the dummy cue;

said control means being also operative to display said cue object on the display means to be semitransparent when the calculated distance between the cue object and the cue ball object is not greater than a predetermined distance, and to display said cue object on the display means to be opaque when the calculated distance between the cue object and the cue ball object is equal to or greater than a predetermined distance.

10. The billiard game machine according to claim 9, wherein said dummy bridge is movable in back and forth longitudinal directions and in lateral directions.

11. The billiard game machine according to claim 10, wherein said control means is operative to display, on the display means, a cue ball strike point at which a tip of the cue object comes into contact with the cue ball object and to move the cue ball strike point on the display means in accordance with movement of the dummy bridge in the back and forth longitudinal directions and in the lateral directions.

12. The billiard game machine according to claim 9, wherein said control means is operative to display, on the display means, an imaginary ball object indicating a strike point for a cue ball object to strike an object ball object positioned on a line aligned with a direction in which a cue object is to be thrust.

13. The billiard game machine according to claim 9, wherein said control means has a means to change a cue-thrusting direction in which the cue object is thrust relative to the cue ball object and to change the billiard table object as viewed in the cue-thrusting direction.

14. The billiard game machine according to claim 9, wherein said control means has a means for selecting a magnified image of a region around the cue object or a reduced image of a region around the cue object.

15. The billiard game machine according to claim 9, wherein a cue-receiving space is formed for receiving a front part of the dummy cue on the dummy billiard table and below the display means, and wherein the dummy billiard table, the dummy bridge and the display means are arranged such that intervals there between meet a dimensional relation that enables the front end part of the dummy cue to enter the cue-receiving space under the display means without making the front end part of the dummy cue strike against the display means even when the dummy cue supported on the dummy bridge is thrust out to a foremost position.

16. The billiard game machine according to claim 15, further comprising a cue-drop preventing member rising from a peripheral part of the dummy billiard table.

* * * * *